US011946317B2

(12) United States Patent
Cugier et al.

(10) Patent No.: US 11,946,317 B2
(45) Date of Patent: Apr. 2, 2024

(54) FLOATING FASCIA SYSTEM FOR WINDOW COVERINGS

(71) Applicant: Emotion Shade, Inc., Encinitas, CA (US)

(72) Inventors: Nicolas M. Cugier, Bentonville, AR (US); Jean-Philippe Cugier, Marnaz (FR)

(73) Assignee: Emotion Shade, Inc., Encinitas, CA (US)

( * ) Notice: Subject to any disclaimer, the term of this patent is extended or adjusted under 35 U.S.C. 154(b) by 128 days.

(21) Appl. No.: 17/550,801

(22) Filed: Dec. 14, 2021

(65) Prior Publication Data

US 2022/0186557 A1 Jun. 16, 2022

Related U.S. Application Data

(60) Provisional application No. 63/227,876, filed on Jul. 30, 2021, provisional application No. 63/125,834, filed on Dec. 15, 2020.

(51) Int. Cl.
*E06B 9/42* (2006.01)

(52) U.S. Cl.
CPC .................................... *E06B 9/42* (2013.01)

(58) Field of Classification Search
CPC ............... E06B 9/42; E06B 9/323; E06B 9/56
See application file for complete search history.

(56) References Cited

U.S. PATENT DOCUMENTS

| | | | | |
|---|---|---|---|---|
| 6,585,208 | B1 | 7/2003 | Fraser | |
| 9,206,641 | B2 * | 12/2015 | Feldstein | A47H 1/12 |
| 10,753,146 | B1 | 8/2020 | Andiarena | |
| 2003/0221794 | A1 | 12/2003 | Morris | |
| 2012/0012260 | A1 * | 1/2012 | Elinson | E06B 9/42 160/375 |
| 2017/0058600 | A1 * | 3/2017 | Mocanu | E06B 9/44 |
| 2022/0298854 | A1 * | 9/2022 | Fitzgerald | E06B 9/42 |

OTHER PUBLICATIONS

GB 20118108.6 Search & Examination Report dated May 31, 2022.

* cited by examiner

*Primary Examiner* — Beth A Stephan
(74) *Attorney, Agent, or Firm* — Aldo Noto, Esq.; RIMON PC

(57) ABSTRACT

A floating fascia system and method for providing an easy to install and adjust mounting system for window coverings. The system has a fascia which holds a functioning shade roller assembly and is adjustable in three planes. The fascia's distance from the wall, height and also left/right position with reference to the window opening are all adjustable.

22 Claims, 16 Drawing Sheets

500
B
560
ENSURE THAT THE FASCIA IS LEVEL. ADJUST THE LEVEL BY TIGHTENING THE RIGHT LEVELING SCREW.
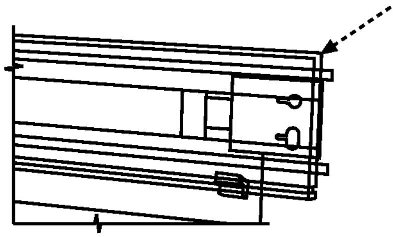
570
SLIDE THE FASCIA ASSEMBLY HORIZONTALLY BY HAND TO BALANCE THE GAPS ON THE SIDES OF THE SHADE
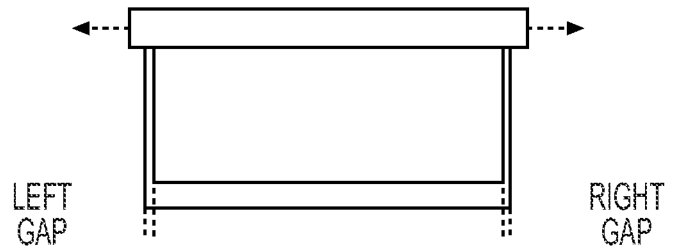
END
FIG. 12C

800

START (801)

810: PLACE A FIRST CEILING BRACKET IN THE RIGHT TOP CORNER OF THE WINDOW FRAME. INSERT AND DRIVE A FIRST SCREW INTO THE OVAL OPENING OF THE CEILING BRACKET TO ATTACH THE CEILING BRACKET TO INSIDE TOP OF WINDOW FRAME. INSERT AND DRIVE A SECOND SCREW INTO THE SAME OVAL OPENING OF THE CEILING BRACKET TO COMPLETE ATTACHMENT TO THE WINDOW FRAME.

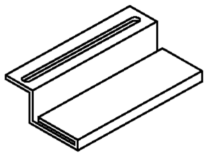

820: PLACE A SECOND CEILING BRACKET IN THE LEFT TOP CORNER OF THE WINDOW FRAME. INSERT AND DRIVE A FIRST SCREW INTO THE OVAL OPENING OF THE CEILING BRACKET TO ATTACH CEILING BRACKET TO INSIDE TOP OF WINDOW FRAME. INSERT AND DRIVE A SECOND SCREW INTO SAME OVAL OPENING OF THE CEILING BRACKET TO COMPLETE ATTACHMENT TO THE WINDOW FRAME.

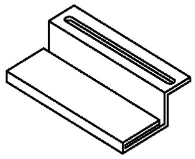

830: INSERT THE ROLLER BRACKET ONTO THE L-BRACKET SUCH THAT THE ROLLER BRACKET WILL BE HELD BY THE HOOKS LOCATED ON THE L-BRACKET.

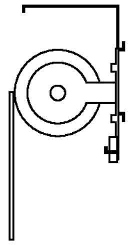

840: SLIDE THE L-BRACKET WITH ROLLER BRACKET ATTACHED INTO THE CENTER CHANNEL OF THE SMART FASCIA.

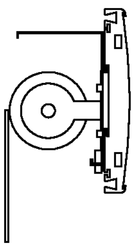

A

FIG. 18A

800

A

ATTACH THE SMART FASCIA TO THE CEILING BRACKET BY INSERTING THE L-BRACKET INTO THE INSERTION BOX OF THE CEILING BRACKET. — 850

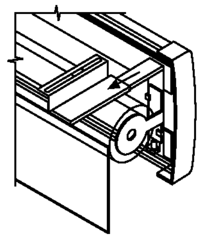

ENSURE THE L-BRACKET IS SECURELY ATTACHED TO THE CEILING BRACKET BY INSERTING THE SAFETY EXTENSION THROUGH A SAFETY SLOT ON THE CEILING BRACKET INSERTION BOX. — 860

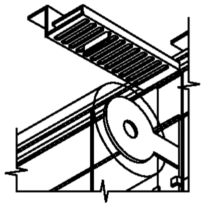

ENSURE THE SMART FASCIA IS LEVEL BY ADJUSTING THE LEVEL SCREW. — 870

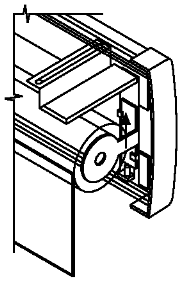

BALANCE THE GAP ON EITHER SIDE OF THE SHADE BY SLIDING THE FASCIA BETWEEN THE CEILING BRACKETS. — 880

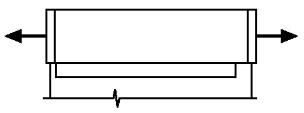

END

*FIG. 18B*

ATTACH THE SMART FASCIA TO THE WALL BRACKETS BY INSERTING THE U-BRACKETS INTO THE INSERTION BOXES OF THE WALL BRACKETS. 950

ENSURE THE SMART FASCIA IS LEVEL BY ADJUSTING THE LEVEL SCREW. 970

BALANCE THE GAP ON EITHER SIDE OF THE SHADE BY SLIDING THE FASCIA BETWEEN THE CEILING BRACKETS. 980

END

FLOATING FASCIA SYSTEM FOR WINDOW COVERINGS

PRIORITY CLAIM

The present non-provisional utility patent application is related to and claims priority from Provisional Patent Application No. 63/227,876 entitled Floating Fascia System for Window Coverings filed on Jul. 30, 2021, which in turn claims priority from Provisional Patent Application No. 63/125,834 entitled Floating Fascia System for Window Coverings filed on Dec. 15, 2020, both of which are hereby fully incorporated herein by reference in their entirety.

TECHNICAL FIELD

The present invention relates generally to coverings for windows, doors, or other structures; and more specifically it relates to roller blind shade coverings and a unique fascia mounting system for such roller blinds. The fascia mounting system of the present invention may also be applied, adapted, or used with other forms of window coverings including rolling shades, roman shades, balloon shades, tie-up shades, Roman blinds, pleated blinds, Venetian blinds, vertical blinds, projection screens, or shutters.

BACKGROUND OF THE INVENTION

The current market for window coverings systems and devices offers numerous solutions including roller blinds (also referred to as roller shades), venetians blinds, curtains, vertical blinds, and roman shades, among others. All or most these systems can be motorized and made "smart" (i.e., electronically automated).

The only solutions that can really match the décor of the pillows or the sofa in a room are roman shades or curtains. Roller blinds typically do not include decorative patterns.

Roller shade systems in the prior art typically require extensive and accurate measurements and marking of the window frame including measurement of the leveling of the window frame. Prior art systems also typically require the use of numerous washers or chimes in order to align the roller and any needed mounting brackets with the window frame. Such time consuming and laborious precision in measurements, leveling and marking are necessary in the prior art to ensure a properly leveled roller so that the roller may operate effectively and so that the roller shade fits the window frame opening properly so as to leave balance and minimal light gaps on each side of the roller shade. Such prior art installations necessarily require many additional parts, tools and supplies.

SUMMARY OF INVENTION

The floating fascia system of the present invention combines the benefits of two of the above-mentioned existing window covering systems: the elegancy of roman shades and the convenience and ease of use of roller blinds. This combination offers a full and not limited means for personalization of the decoration around an opening as well as an increased ease of installation of a window covering.

A further embodiment of the present invention also provides a support structure made of extruded aluminum or other materials including but not limited to, plastic, synthetic materials, other metals or alloys, or composite materials. This "smart fascia" structure provides a base for the connection of smart devices to the fascia and roller assembly, enables the motorization of the roller assembly and further connection to any available smart home system present in the home.

In addition, when the fascia is constructed of various materials, including but not limited to aluminum or wood, the fascia can be painted or dressed in fabric or covered with a paint protection film (PPF), an adhesive film, an adhesive paper, or a display surface (such as LCD, OLED, or other thin surface display technology), in order to match or coordinate with the walls or other home décor elements. A decorative sleeve can be further added to the fascia for additional decoration and can be easily updated and/or swapped out for various holidays, seasonal décor, promotional message in commercial or professional building or offices, or other changes to the décor of the room in which the fascia is installed. Decorative cover plates may be added to or attached to each end of the fascia to improve the aesthetic of the fascia and roller assembly and to hide any structural elements of the fascia.

In one aspect the present invention provides a floating fascia system to enable mounting of roller shade window coverings. The floating fascia system includes two fixing brackets to provide spacing of a roller shade assembly from a window and to secure the roller shade assembly to a window frame of the window, wherein at least one of the fixing brackets includes a shim, and wherein the roller shade assembly includes a roller bracket and a window shade roller. In a preferred embodiment, the fixing bracket takes the form of a T-bracket. In further alternate embodiments, the fixing brackets may take the form of ceiling or wall brackets. These fixing brackets can be L-shaped, U-shaped or other. While fascia may be in various sizes and shapes, typically, the fascia are at least as wide as the window. In one embodiment, the floating fascia system further includes a fascia extending at least as wide as the width of the window frame, at least two fascia brackets to enable attachment of the fascia to each of at least two T-brackets, wherein one fascia bracket may be placed toward each end of the fascia, a locking pin for attaching the fascia brackets to the T-brackets, and a level screw for adjusting spacing between the fascia brackets and the T-brackets in a y-direction. The fascia brackets and roller brackets of the floating fascia system are attached to the fascia, and the fascia brackets are attached to the T-brackets after the T-brackets have been affixed to the upper corners of the window frame. The fascia of the floating fascia system is further adjustable in an x-direction. The floating fascia system may further include a center bracket support for the fascia. The floating fascia system may further include an integrated shim such that the shim provides adjustment of a position of the T-bracket in the z-direction relative to the window.

In another aspect, there is provided a system for mounting a roller shade, the system having two mountable wall brackets each having an ear, wherein the ear guides a location to mount the wall brackets relative to a window and wherein the brackets are adjustable in a z-direction through use of integrated shims. The system also includes two locking pins, two fascia brackets each affixable onto one of the wall brackets with one of the locking pins, wherein the locking pin passes through an opening in one of the fascia brackets and an opening in one of the wall brackets, a fascia mounted to the two fascia brackets, two leveling screws each operably connected to one of the fascia brackets and one of the wall brackets wherein a position in a y-axis of the fascia bracket in relation to the wall bracket is adjustable, and an operable roller shade assembly connected only to the fascia wherein the roller shade assembly is not connected to the wall or window frame.

The above-described systems may further include a fabric fascia cover.

The above-described systems may further include a center bracket for supporting the fascia.

The above-described systems may further include LED lights mounted on the fascia.

The fascia bracket and the fascia of the above-described systems may be one piece.

The roller shade assembly system of the above-described systems may be a smart roller shade assembly.

In yet another aspect, the present invention provides a method for mounting a floating window roller shade, the method includes the steps of: mounting a first wall bracket on a right side of a window frame opening; mounting a second wall bracket on a left side of the window frame opening; wherein each wall bracket has a main body and an ear which is approximately perpendicular to the main body and wherein when mounted each wall bracket ear is closer to the window than the main body; adjusting the mounting of at least one wall bracket in a z-direction using an integrated shim, wherein the adjusting moves the ear away from the window; attaching a roller shade assembly to a fascia and not attaching the roller shade assembly to the wall; fastening the fascia with attached roller shade assembly to the first and second wall brackets using a locking pin; wherein a functioning roller shade may be rolled up and down; adjusting a height of the fascia relative to one of the mounted wall brackets using a leveling screw; and adjusting a position of the fascia left or right to make a gap between the roller shade and the widow frame similar on right and left of the roller shade.

In yet another aspect, the present invention provides a method for mounting a floating window roller shade, the method includes the steps of: mounting a wall bracket with ears on each of a right and left side of a window frame opening; adjusting the mounting of at least one wall bracket in a z-direction using an integrated shim; fastening a fascia bracket to each of the two wall brackets using a locking pin; coupling the fascia to the fascia bracket; adjusting in a y-direction the position of the fascia relative to a wall bracket using a leveling screw; attaching a roller shade assembly to the fascia and not attaching the roller shade assembly to the wall; wherein the roller shade assembly includes a rolled-up window shade which is movable from a lowered down position to a rolled-up position; wherein a functioning roller shade may be rolled up and down without interference from the window, window frame or wall; adjusting a position of the fascia in an x-direction to make a gap between the roller shade and the widow frame similar on right and left of the roller shade.

The above-described methods may further include the step of attaching a fabric cover to the fascia.

The above-described methods may further include the step of painting the fascia.

The above-described methods may further include the step of attaching LED lights to the fascia.

The above-described methods may further include the step of attaching one or more sensors to the fascia.

The above-described methods may further include the step of mounting an electric motor to lower and raise the rolled-up window shade.

In yet another aspect, the present invention provides a mountable window covering with roller shade and fascia including a ceiling bracket having an opening and an insertion box with multiple slots, wherein the ceiling bracket is adjustably mountable to a ceiling using the opening, wherein the mounting is adjustable in the z-axis; an L-bracket with a safety extension, channel hooks, hooks, and a level screw, wherein the L-bracket connects to the ceiling bracket through the insertion box and wherein the safety extension fits within a one of the multiple slots, and wherein the L-bracket is adjustable in the z-axis with reference to the ceiling bracket. The mountable window covering further includes a roller with a window covering; a roller bracket attached to the roller and connected to the L-bracket, wherein the roller bracket is held by the L-bracket with the hooks and rests on a level screw. And the mountable window covering also includes a fascia mounted on the L-bracket, wherein the fascia includes a horizontal channel; wherein channel hooks fit in the horizontal channel, and wherein the channel hooks are slidable in the horizontal channel, wherein the fascia can be moved with reference to the L-bracket in the x-axis; and wherein the level screw can adjust the location of the roller with reference to the L-bracket in the y-axis.

The above-described mountable window covering may be further configured so that the L-bracket further includes a vertical member for mounting and is described as a U-bracket.

The above-described mountable window covering may further include a fabric fascia cover.

The above-described mountable window covering may further include a center bracket for supporting the fascia.

The above-described mountable window covering may further include LED lights mounted on the fascia.

The roller shade assembly of the above-described mountable window covering may be a smart roller shade assembly.

The above-described systems may further be configured such that the assembly includes a sensor attached to one or more of a motor, processor, and switch.

The above-described systems may further be configured such that the assembly includes a side cover attached to inserts.

The above-described systems may further be configured such that the assembly includes a leveling screw for leveling the fascia.

The above-described systems may further be configured such that the L bracket has free movement for adjustments.

The above-described systems may further be configured such that the assembly includes grooves created to clip and adjust one or more of fabric, side covers, accessories, and fascia coverings.

Technical Innovations of the Present Invention

The combination of the floating fascia elements and novel mounting brackets, such as a T-bracket, form a novel solution that provides numerous benefits over the prior art in the mounting of window coverings. The benefits include easy mounting and adjustability.

The unique mounting brackets, including the T-Bracket, provide a means of fixing of a window covering to the wall that is easy to accomplish on a first pass and requires little further adjustment. For example, the brackets are mounted on the wall at the top corners of the window frame. Installation of the T-bracket does not require any prior marking or measurements or any leveling of the T-brackets themselves. A simple leveling screw is provided for leveling after mounting the fascia to the T-brackets. The T-bracket essentially aligns itself (through the right-angle ear) and enables an installer to compensate for any defects in the alignment or level of the window with adjustments.

Further, by assembling the window covering, i.e., roller shade, and its support to the fascia itself (rather than the mounting brackets), the window covering roller shade becomes independent from the mounting brackets.

The means of attaching the fascia to the T-brackets, L-brackets and U-brackets also offers the possibility to easily balance the light gap on each side of the shade (left and right) for a more pleasing fit and design on the window.

By providing for an alternate embodiment of a "smart fascia" structure combining a fascia with a unique fascia bracket design, the roller shade (or other form of window covering including but not limited to rolling shades, roman shades, balloon shades, tie-up shades, Roman blinds, pleated blinds, Venetian blinds, vertical blinds, projection screens, or shutters) may be attached easily to the fascia. Fascia are typically used as a cover to hide the window covering solution, whereas in the present invention fascia may be used as part of the structural support and to improve the ease of installation as well.

In addition, this "smart fascia" embodiment enables an extra level of modularity whereby additional features or devices, including but not limited to smart automation features, lighting, light sensors, intrusion sensors, noise detection sensors, temperature sensors, motion detectors, smoke or carbon monoxide sensors, can be paired to the fascia prior to installation, during manufacturing or later during a retrofit after installation.

It is also noted that most embodiments of the present invention require no more than 5 or 6 unique parts for a complete installation: brackets, support fascia or smart fascia, shims, locking pins, level screw, and standard screws. This reduction in total parts greatly simplifies the installation process and lowers costs.

It is further noted that the smart and floating fascia systems of the present invention may be used for mounting in or on either indoor window openings, door openings, or other openings, or in or on outdoor window openings, door openings, or other openings.

In these and other respects, the proposed smart and floating fascia systems depart substantially from the conventional compositions and methods of use of the prior art. In doing so, the present invention provides a composition, and a method of using the composition, primarily developed for the purpose of providing an easy to install and adjust mounting system for window coverings either inside or outside of a building having a window or opening needing a covering.

BRIEF DESCRIPTION OF THE DRAWINGS

Various other objects, features and attendant advantages of the present inventions will become fully appreciated as the same becomes better understood when considered in conjunction with the accompanying drawings, in which like reference characters designate the same or similar parts throughout the several views, and wherein:

FIG. 12C illustrates the concluding steps of a method 500 for installing the floating fascia system of the present invention.

FIG. 18A illustrates the initial steps of a method 800 for installing the ceiling mount smart fascia system 600 of the present invention.

FIG. 18B illustrates the concluding steps of a method 800 for installing the ceiling mount smart fascia system 600 of the present invention.

DETAILED DESCRIPTION OF EMBODIMENTS

Figure 1:
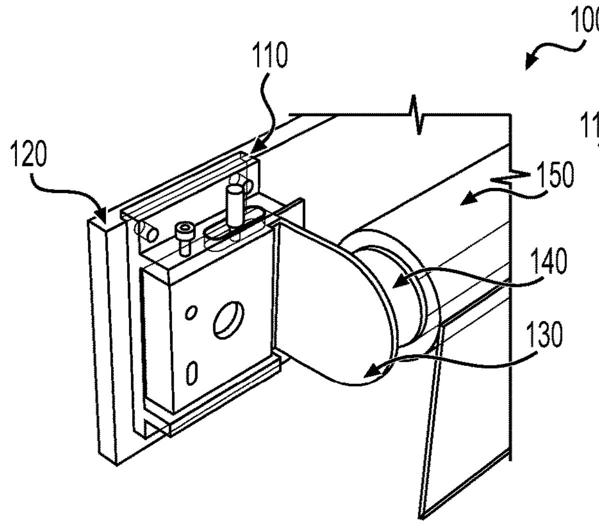
FIG. 1 is a composite view of a floating fascia system 100 according to a first embodiment of the present invention.

Turning now to a detailed description of the drawings and embodiments, it is noted that similar reference characters denote similar elements throughout the several views, where FIGS. 1 through 12 will be described to illustrate a floating fascia system and method according to one or more embodiments of the present invention. FIGS. 13 through 19A and 19B will also be described to illustrate a further smart fascia system and method according to one or more additional embodiments of the present invention.

FIG. 1 shows an example of a composite view of a floating fascia system (100) according to a first embodiment of the present invention.

The floating fascia system (100) of FIG. 1 comprises at least two fascia brackets (110). A fascia (120) is mounted on two or more fascia brackets (110). At least one fascia bracket (110) is located near each of the two ends of the fascia (120), and wherein each fascia (120) is affixed to the fascia bracket (110) by means of one or more but preferably at least three screws (not labeled).

The floating fascia system (100) of FIG. 1 further comprises a unique fixing bracket (130) that serves to secure the floating fascia system (100) to the window frame wall (not shown), wherein this bracket may be referred to as a "T-bracket" (130). Each of the at least two T-brackets (130) for each fascia (120) are fixed to the window frame wall and may then also be secured to each fascia bracket (110) to enable the attachment of the fascia (120) to the window frame wall. Each T-bracket (130) may be made of any sturdy material some examples are metal (e.g., extruded aluminum), plastic (e.g., molded plastic), wood or a composite.

Figure 5:
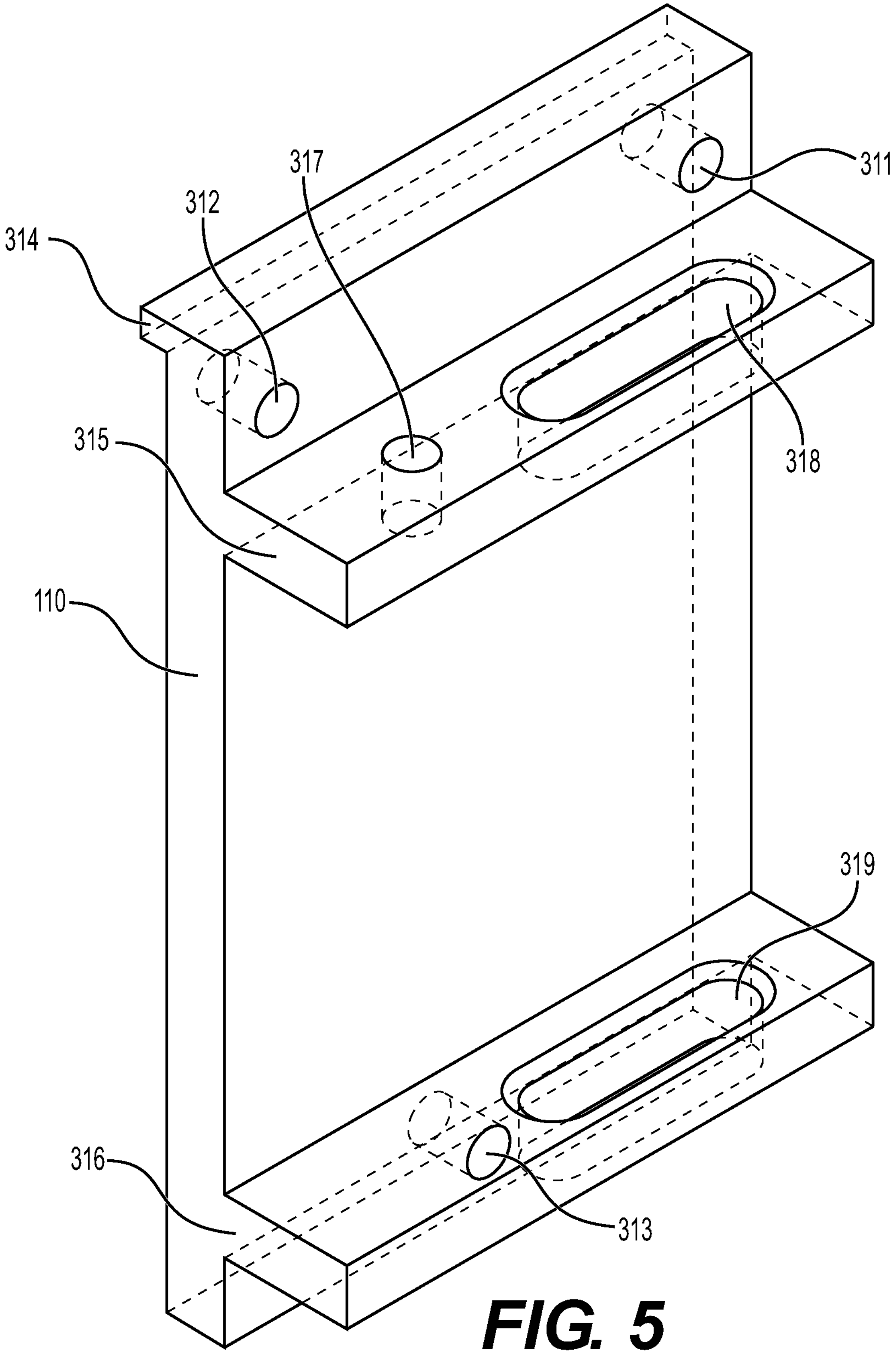
FIG. 5 is a detailed orthogonal view of a fascia bracket according to the first embodiment of the present invention.

The fascia bracket (110) is shown (by itself) in more detail in FIG. 5. As shown in FIG. 5, one or more, and in the preferred embodiment shown at least two, pre-formed screw holes (311, 312) may be provided near the top edge of the largest primary surface of each fascia bracket (110), corresponding to the top region of the fascia (120). At least one screw hole (313) may be provided near the bottom edge of the largest primary surface of each fascia bracket (110), corresponding to the bottom region of the fascia (120). Each fascia bracket (110) may be made of various materials which are sturdy enough to carry the weight of the fascia including metals, for example, extruded aluminum, plastics, for example molded plastic, wood, or composite materials. The fascia (120) may be made of many different materials including various decorative materials. The fascia (120) is typically made of wood, plastics, aluminum or composites and can be painted or dressed in fabric to match the décor of the room in which the window (not shown) is found. However, many other more exotic man-made or natural materials may be used such as plaster, porcelain, or PVC.

Each fascia bracket (110) may be formed in a generally rectangular shape on its primary surface. At the top edge of the primary surface, a lip surface (314) extends away from the back of the fascia bracket (110), wherein the lip surface (314) is configured to extend over the top edge of the fascia (120). Two additional ridge elements (315, 316) extend out perpendicularly from the primary surface of the fascia bracket (110) in the direction away from the fascia (120) and towards the window. These ridge surfaces (315, 316) traverse the primary surface parallel to each other and parallel to the top edge and the bottom edge of fascia bracket (110). The topmost ridge surface (315) includes two holes (317, 318) passing through the ridge surface (315). A circular screw hole (317) is situated towards one end and an oval slot (318) is situated near the opposite end. The lower ridge surface (316) includes a further oval slot (319) located directly below the corresponding oval slot (318) on the topmost ridge surface (315). A level screw (170), as shown in FIGS. 1-4, may be inserted into the circular screw hole (317) on the topmost ridge surface (315). The level screw (170) may be turned to clockwise to push down through the fascia bracket (110) and onto the top surface of a T-bracket (130), thereby raising the fascia bracket (110) in relation to the T-bracket (130) and thus also raising the fascia (120) in relation to the window once the T-bracket (130) is affixed to the window frame (not shown). This provides for making adjustments in the positioning of the fascia (120) in the up-and-down or y-direction. A locking pin (180) may be inserted into the oval slot (318) on the topmost ridge surface (315) and extend down through to and into the oval slot (319) on the lower ridge surface (316). The locking pin (180) serves to adjustably affix the fascia bracket (110) to the T-bracket (130). In alternate embodiments, another means of fastening the fascia bracket (110) to the T-bracket (130) other than with the locking pin (180) may be implemented. Such alternate fastening may be achieved by a magnetic device or a clipping system or other appropriate means of fastening one bracket to another.

Figure 3:
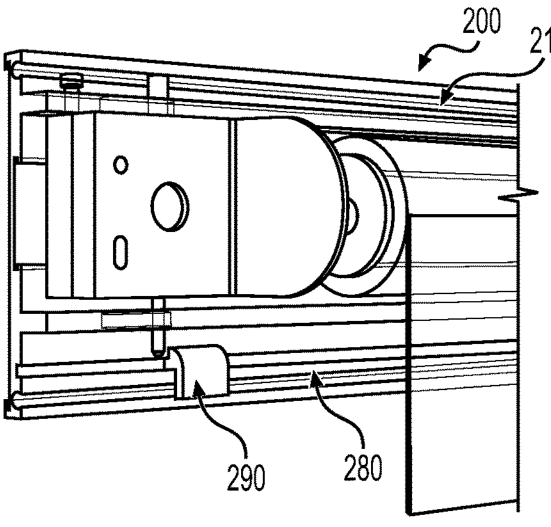
FIG. 3 is a composite view of a smart fascia system 200 according to a further embodiment of the present invention.
Figure 4:
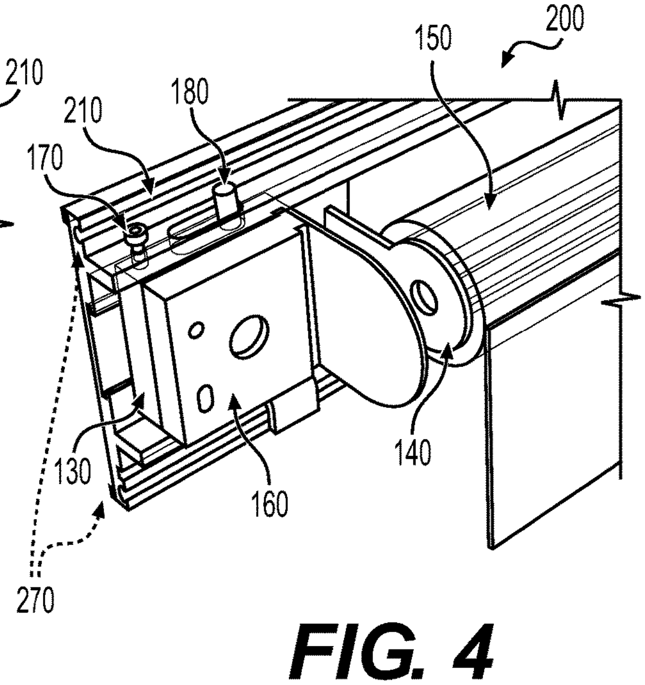
FIG. 4 is a closer composite view of a smart fascia system 200 according to a further embodiment of the present invention.
Figure 6:
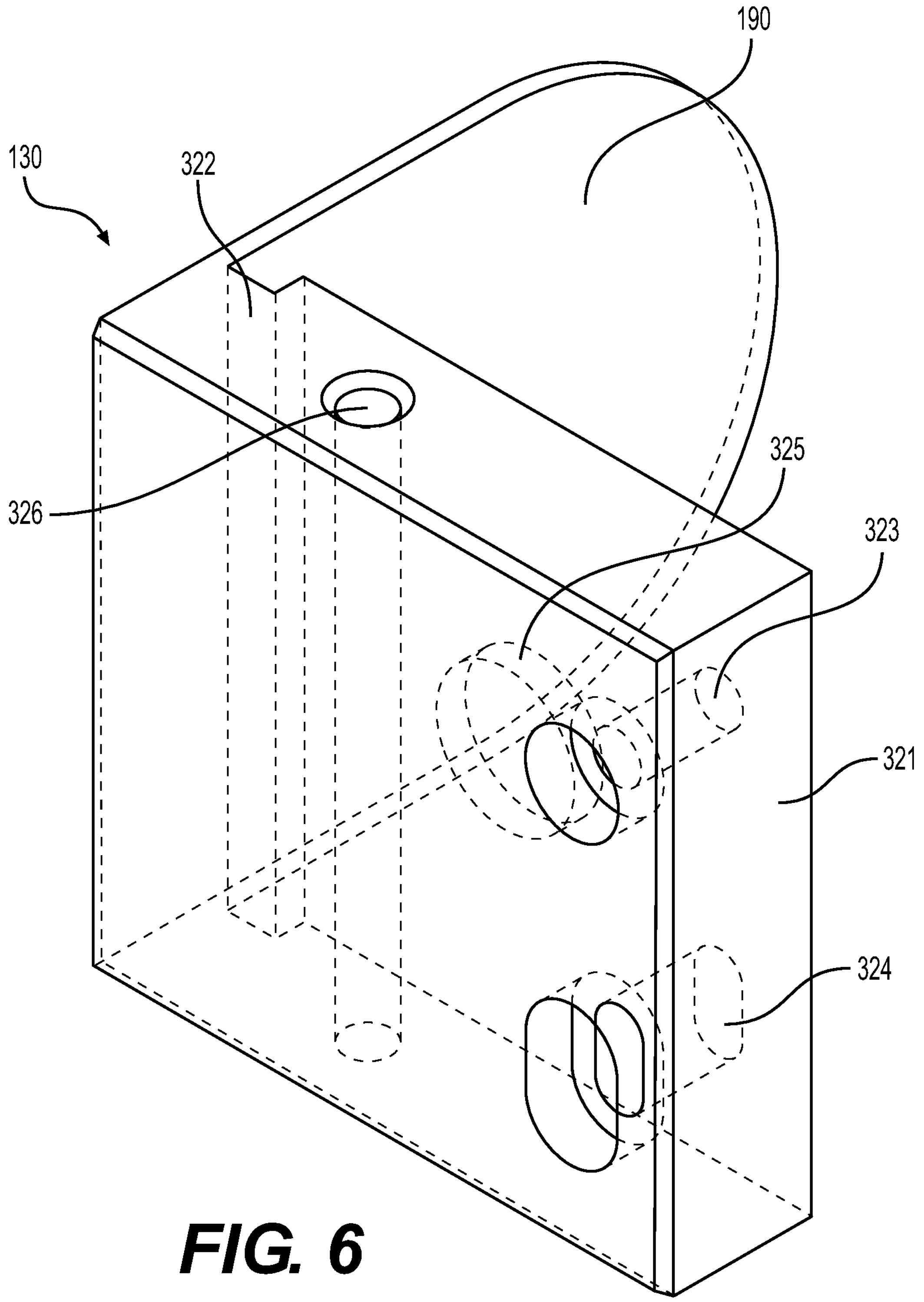
FIG. 6 is a detailed orthogonal view of a T-bracket according to the first embodiment of the present invention.

FIG. 6 shows the T-bracket (130) in more detail. The T-bracket (130) includes a rectangular main body (321) which includes at least two holes (323, 324) for inserting screws to affix the main body (321) of the T-bracket (130) to the window frame. The T-bracket (130) further includes an ear (190) extending perpendicular to the main body (321). The ear (190) may be formed in a roughly semicircular shape which mirrors and aligns with the circular shape of a roller assembly (140, 150), as seen in FIGS. 1, 3, and 4.

Figure 8:
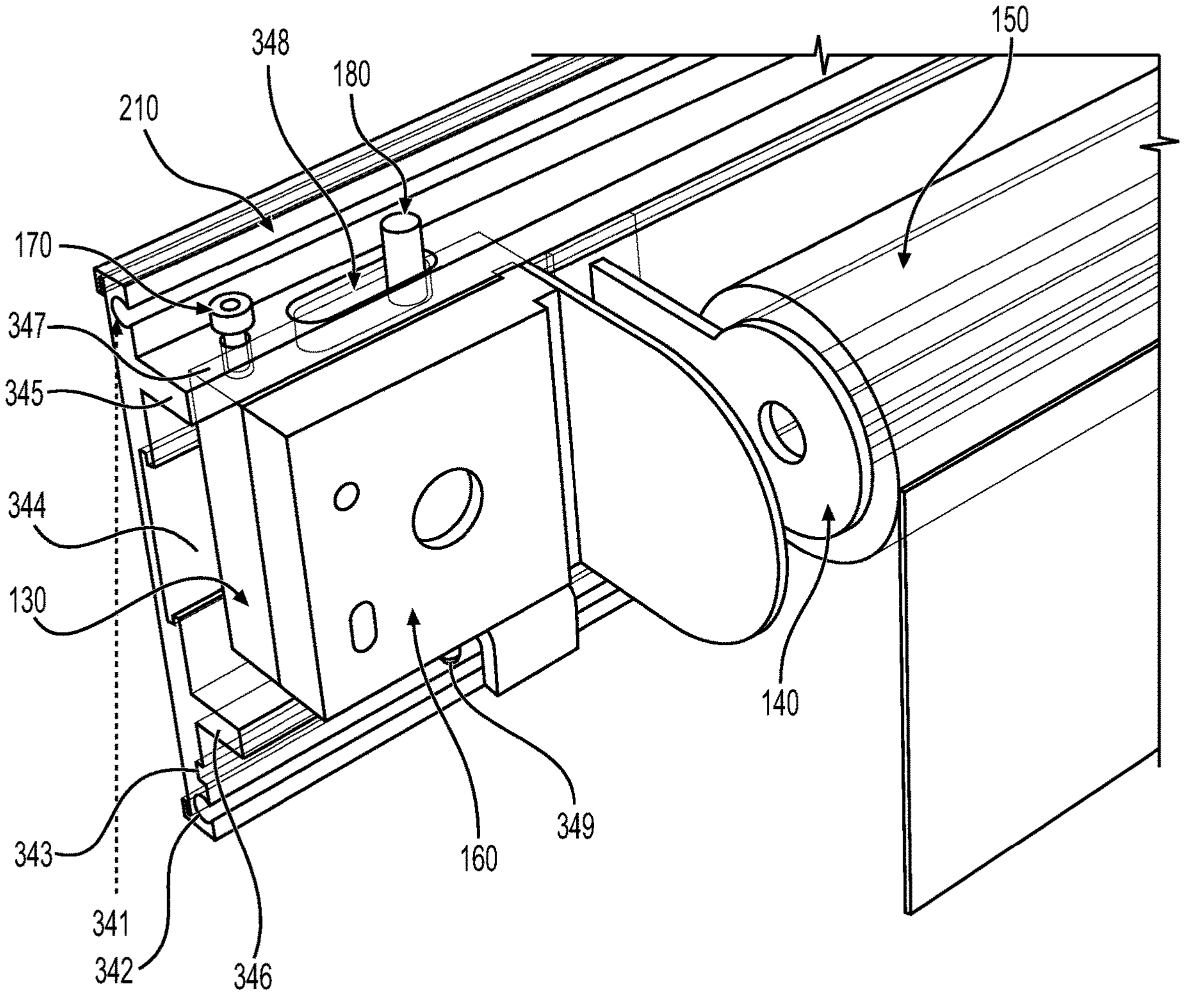
FIG. 8 is a detailed view of the smart fascia system 200 of FIG. 4.

An exemplary roller assembly (140, 150), as shown in FIG. 8, comprises a roller bracket (140) and a window covering roller shade (150), wherein these parts are commonly found in the art of window covering systems. At least two roller brackets (140) are attached to the window-facing side (or back) of the fascia (120) by means of screws (not shown), and the window covering roller shade (150) is mounted between the two roller brackets (140). In alternate embodiments, the assembly of the roller brackets (140) and the roller shade (150) may be attached to the ears (190) of the T-brackets (130) rather than to the fascia (120)

In one embodiment of the present invention, the roller brackets (140), roller shade (150) and fascia brackets (110) are secured to the fascia (120) by means of appropriate screws. This assembly of the fascia (120), fascia brackets (110), roller brackets (140) and roller shade (150) may occur before the connection of the fascia brackets (110) to the T-brackets (130). In alternate embodiments, the fascia brackets (110) may be secured to the T-brackets (130) prior to securing the fascia (120) (along with the attached roller brackets (140) and roller shade (150)) to the fascia brackets (110).

Figure 2:
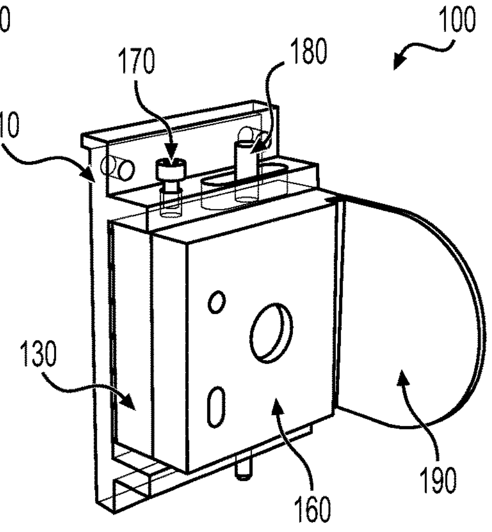
FIG. 2 is a closer composite view of a floating fascia system 100 according to a first embodiment of the present invention.

FIG. 2 shows the fascia bracket (110) and T-bracket (130) of FIG. 1 along with one shim (160) affixed to the T-bracket (130).

Figure 7:
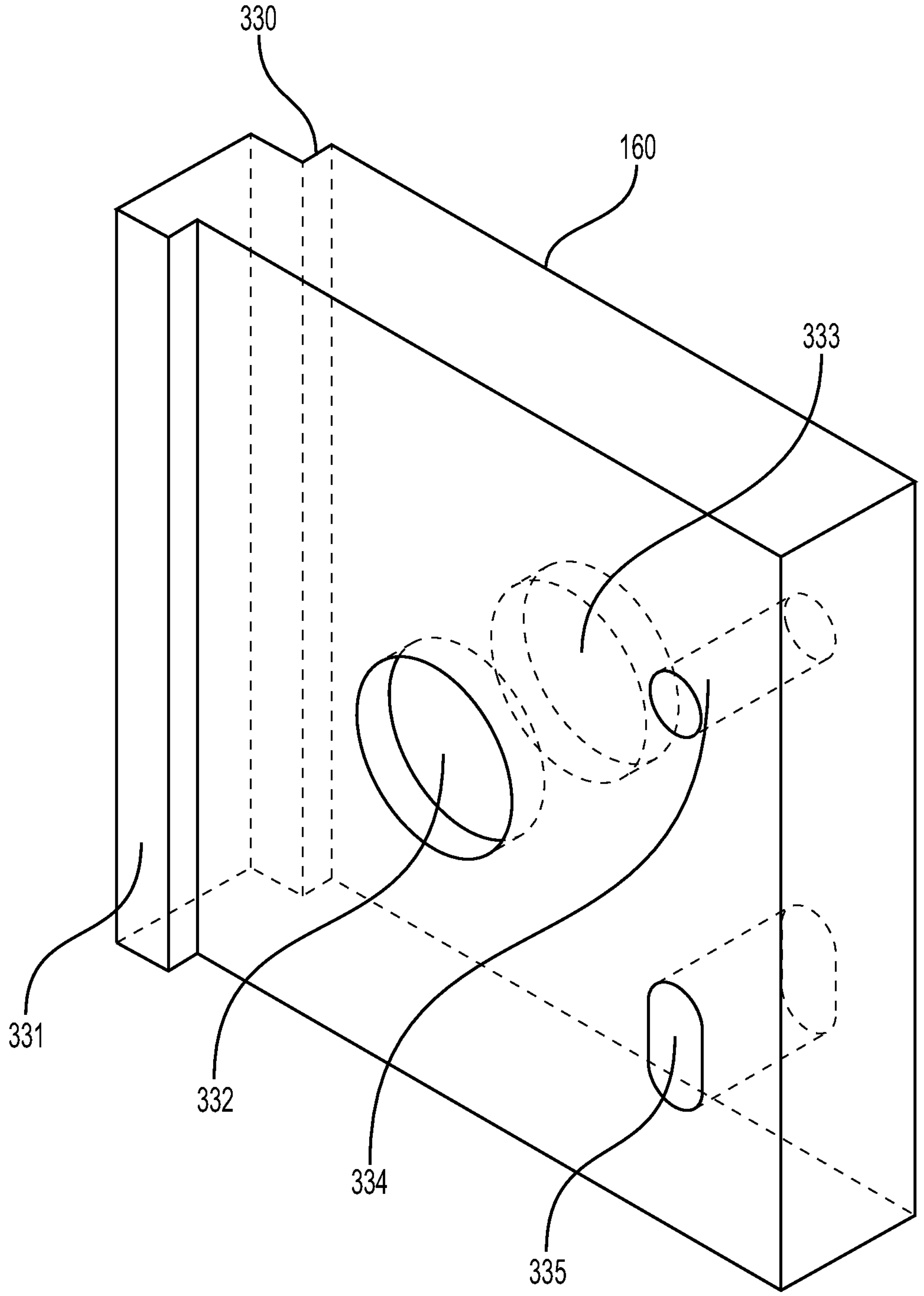
FIG. 7 is a detailed orthogonal view of a shim according to the first embodiment of the present invention.

The rectangular main body (321) of the T-bracket (130) shown in FIG. 6 includes a slit cut-out (322) that may be milled or molded into the window-facing surface of the main body (321) of the T-bracket (130) along the extent of the main body (321) where it adjoins the ear (190) of the T-bracket (130). This slit (322) allows a matching ridge (331) that extends out from along a matching edge of a shim (160), as shown in FIG. 7, to be inserted into the slit (322) of the main body (321) of the T-bracket (130) and provide a tight matching fit of the shim (160) to the T-bracket (130). A shim (160) is not necessary unless required for proper spacing of the fascia (120) from the wall or window frame. The shim (160) is shown in more detail in FIG. 7.

The window-facing surface of the main body (321) of each T-bracket (130) includes one or more, but preferably at least two, pass-through screw holes (323, 324) to affix the T-bracket (130) to the wall at the window frame. One circular screw hole (323) may be located to one side of the main body (321) of the T-bracket (130) and above a second oval-shaped screw hole (324). The oval-shaped screw hole (324) enables adjustment of the vertical placement of the T-bracket (130) on the window frame.

In the preferred embodiment, the arrangement described above enables a T-bracket (130) intended for attachment to an upper right corner of a window. That same T-bracket (130) would be flipped around the center of its main body for attachment to an upper left corner of the window, with the second oval-shaped screw hole (324) now placed above the circular screw hole (323). In alternate embodiments, the placement of the pass-through screw holes (323, 324) described in the preceding paragraph enables a specific right-handed T-bracket (130) for attachment to the upper right corner of a window, and a separate left-handed T-bracket (130) may be formed wherein the oval-shaped screw hole (324) remains below the circular screw hole (323).

In the center of the window-facing surface of the main body (321) of the T-bracket (130) a circular recess (325) is provided. This recess (325) enables a matching shaped circular protrusion (332) from the fascia-facing surface of a shim (160), seen in FIG. 7, to connect to the T-bracket (130) and align properly with the surfaces and holes of the main body (321) of the T-bracket (130).

The main body (321) of the T-bracket (130) also includes a circular vertical pass-through hole (326) passing from the top surface of the main body (321) of the T-bracket (130) down to the bottom surface of the main body (321) of the T-bracket (130). This vertical hole (326) corresponds generally to the location of the oval slots (318, 319) on the top and bottom ridges (315, 316) of the fascia bracket (110). A locking pin (180), as shown in FIGS. 1-4, may be inserted through the oval slot (318) on the top ridge (315) of the fascia bracket (110), pass down through the vertical pass-through hole (326) of the T-bracket (130), and through the oval slot (319) on the bottom ridge (316) of the fascia bracket (110). This locking pin (180) will then secure the installation of the fascia bracket (110) onto the T-bracket (130). At least one locking pin (180) will be needed for each assembly of a T-bracket (130) to a fascia bracket (110), or one on each end of a fascia (120). The locking pin (180) may be made of various materials including steel, aluminum, or molded plastic.

During installation, should the ear (190) of the T-bracket (130) contact the window frame, or contact the window itself, one or more shims (160) may be affixed to the main body (321) of the T-bracket (130) to provide further spacing to move the ear (190) away from the window by moving the T-bracket (130) away from the window and the wall. Each shim (160) may be made of various materials including extruded aluminum or molded plastic.

A shim (160) is shown in more detail in FIG. 7. Each shim (160) takes the same shape as the main body (321) of the T-bracket (130) and includes at least two pass-through screw holes (334, 335) positioned and sized to match up with the at least two pass-through screw holes (323, 324) in the main body (321) of the T-bracket (130). As with the T-bracket (130), in the center of the window-facing surface of the shim (160) a circular recess (333) is provided. This recess (333) enables a matching shaped circular protrusion (332) from the fascia-facing surface of a further shim (160') (not shown) to connect to the first shim (160), if more than one shim (160) is required to properly space the fascia (120) away from the window. In alternate embodiments, the recess (333) and the protrusion (332) may be formed to match each other with shapes other than circular, such as a square, rectangular shape, star, or other appropriate shapes to enable an easy and secure connection. Additionally, the window-facing surface of each shim (160) includes a slit cut-out (330) along the extent of the window-facing surface of each shim (160). This slit (330) allows the ridge (331) along a matching edge of a further shim (160') to be inserted and provide a tight matching fit of the further shim (160') to the first shim (160), if more than one shim (160) is required to properly space the fascia (120) away from the window.

FIGS. 3 and 4 show a further embodiment of the floating fascia system (100) of the present invention. This embodiment may be referred to as a smart fascia system (200), signifying that it is intended to enable the placement of various "smart" devices and accessories on the fascia to assist in automating the use of the window covering mounted with the floating fascia system. The smart fascia system (200) of FIGS. 3 and 4 includes components identical in function and form to the roller bracket (140), window covering roller shade (150), T-bracket (130), locking pin (180), shim (160) and level screw (170) for the floating fascia system (100) shown in FIGS. 1 and 2 and described above. The embodiment of FIGS. 3 and 4 differs from that of FIGS. 1 and 2 such that the fascia bracket (110) from FIGS. 1 and 2 is combined with the fascia (120) of FIGS. 1 and 2 to form one piece, a smart fascia (210). The smart fascia (210) may be made from extruded aluminum or other appropriate material. The smart fascia (210) may also include one or more cavities or channels (270) to enable the attachment of various accessories including rods to hold fascia coverings, sensors, or LED light strips, among others. The smart fascia (210) presents a generally constant cross section across its full length, wherein that cross section resembles the form of the fascia bracket (110) from FIGS. 1 and 2. In this way, the fascia may be sold in long lengths to be cut on site by the installer.

Referring to FIG. 8, the smart fascia system (200) of FIGS. 3 and 4 is shown in closer detail in FIG. 8. As with FIG. 4, FIG. 8 shows a T-bracket (130) attached to a smart fascia (210). A shim (160) is further attached to the T-bracket (130). As shown in FIG. 8, the smart fascia (210) includes at least two ridged surfaces (345, 346) extending perpendicularly from the main smart fascia surface. The ridges correspond generally to the ridges (315, 316) found on the fascia bracket (110) seen in the first embodiment of FIGS. 1, 2, and 5, and function in the same manner. As with the ridges (315, 316) from the first embodiment, the ridges (345, 346) of the smart fascia (210) include holes (347, 348, 349) to enable the attachment of T-brackets (130).

A circular screw hole (347) is situated towards one end of the top ridge (345) and an oval slot (348) is situated near the opposite end. The lower ridge surface (346) includes a further oval slot (349) located directly below the corresponding oval slot (348) on the topmost ridge surface (345). A level screw (170) may be inserted into the circular screw hole (347) on the topmost ridge surface (345). The level screw (170) may be turned to clockwise to push down through the smart fascia (210) and onto the top surface of the T-bracket (130), thereby raising the smart fascia (210) in relation to the T-bracket (130) and thus also raising the smart fascia (210) in relation to the window once the T-bracket (130) is affixed to the window frame (not shown). A locking pin (180) may be inserted into the oval slot (348) on the topmost ridge surface (345) and extend down through to and into the oval slot (349) on the lower ridge surface (346). The locking pin (180) serves to affix the smart fascia (210) to the T-bracket (130).

Optionally, the smart fascia (210), as shown in FIG. 8, further includes at least two circular cross section channels (341, 342) for holding fabric rods (not shown) that enable easy attachment of fabric coverings to the outer face of the smart fascia (210). One or more further notched channel(s) (343) may also be provided in the lower end of the smart fascia (210), below the lower ridge (346) and above the lower rod channel (342). The notched channel(s) (343) may be rectangular, trapezoidal, or dovetailed in form and shape, and the notched channel(s) (343) enable the placement of various "smart" accessory devices such as sensors (290) or LED light strips (280), as seen in FIG. 3.

Similar to the first embodiment, the roller bracket (140) of FIG. 8 may be attached to the smart fascia (210), and the window covering roller shade (150) mounted onto the roller bracket (140). A further center channel (344) may be formed in smart fascia (210) in the shape of a rectangular, trapezoidal, or dovetailed notched shape running parallel to the center line of the smart fascia (210). The center channel (344) may be provided to enable placement or attachment of additional extensions to the smart fascia (210). The roller brackets (140) may be attached to the smart fascia (210) by means of fitting securely into the center channel (344), or into other similar channels formed into the window-facing surface of the smart fascia (210).

In further alternate embodiments of the floating fascia system (100) of the present invention, as seen in FIGS. 1 and 2, a third fascia bracket (110') (not shown) may be attached at a middle or centered position along the length of the fascia (120) and an additional center support bracket (not shown) attached to the fascia bracket (110) and further attached to the window frame in order to provide additional weight and center support for long or heavy fascias (120) that may require added support. Alternatively, the additional center support bracket may be attached directly to the fascia (120) and to the window frame without need of a fascia bracket (110). Additionally, in similar alternate embodiments of the smart fascia system (200) of the present invention, as shown in FIGS. 3, 4 and 8, an additional center support bracket (not shown) may be attached to the smart fascia (210) and further attached to the window frame to provide additional weight and center support.

Figure 9:
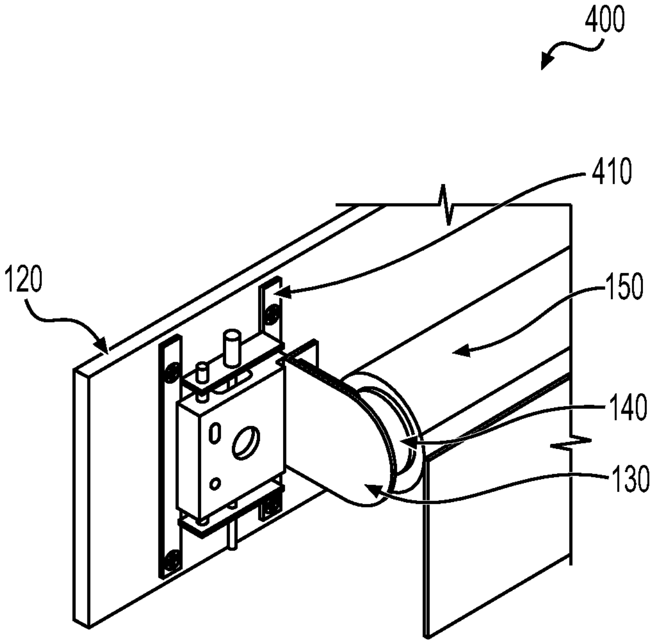
FIG. 9 is a composite view of a floating fascia system 400 according to an alternate embodiment of the present invention.
Figure 10:
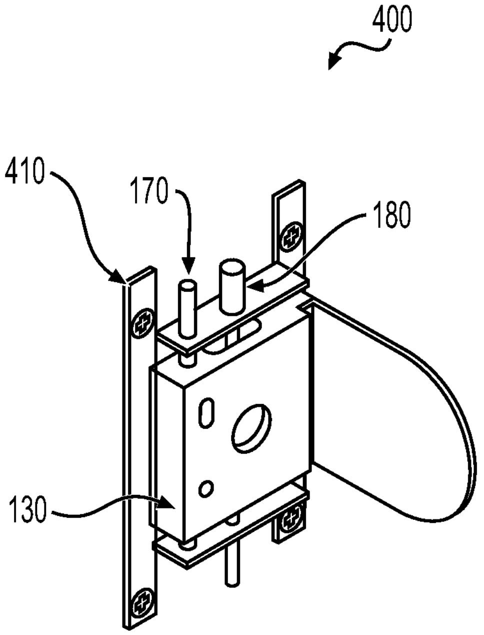
FIG. 10 is a detailed composite view of a floating fascia system 400 according to an alternate embodiment of the present invention.
Figure 11:
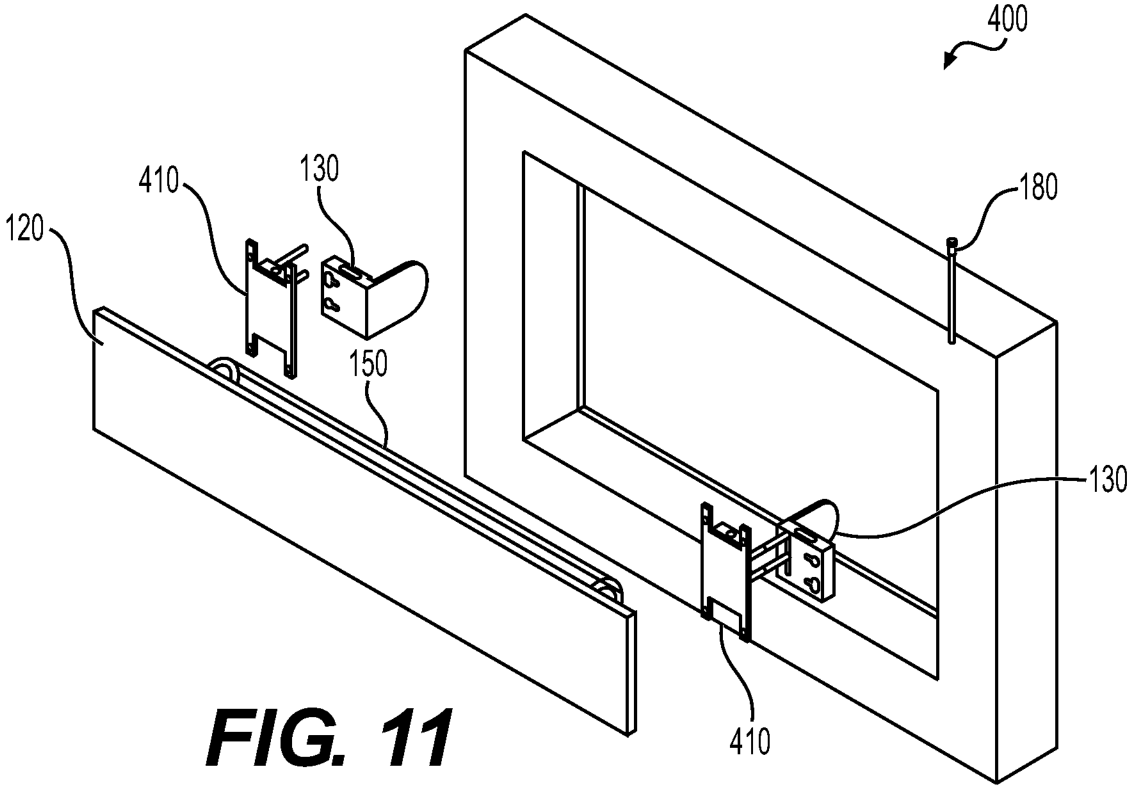
FIG. 11 is a composite exploded view of a floating fascia system 400, ready for installation into a window frame or box according to an alternate embodiment of the present invention.

FIGS. 9, 10 and 11 illustrate a floating fascia system (400) that is a further alternative embodiment of the floating fascia system (100) of FIGS. 1 and 2. The H-shaped metal piece (410) is a fascia support (410) that serves the same function as the fascia bracket (110) of FIGS. 1 and 2. The fascia support (410), having an essentially flat H-shape, may be formed by cutting or stamping the desired shape out of an appropriate size section of sheet metal, wherein the metal may be aluminum, steel, or other suitable metal alloy having the desired strength and weight characteristics. The floating fascia system (400) of FIGS. 9 and 10 includes the fascia support (410), a locking pin (180), a T-Bracket (130), a roller shade (140), a fascia (120), a shim (160), and a leveling screw (170).

FIG. 9 is a composite view of the floating fascia system (400) according to a further alternate embodiment of the present invention. In FIG. 9, the fascia support (410) takes the role of the fascia bracket (110) from FIG. 1 and is secured to the fascia (120) by means of four screws each driven through holes in each of the four-tab extensions forming the H-shape of the fascia support (410). As with the fascia bracket (110), the fascia support further includes surfaces perpendicular to the main surface of the fascia support (410) through which holes are provided to enable the placement of the locking pin (180) and level screw (170) that may then pass through, in the case of locking pin (180), or press against, in the case of the level screw (170), the T-bracket (130). As such, the fascia support (410) serves to secure the fascia (120) to the T-bracket (130), and when the T-bracket has been secured to the wall of the window frame, the fascia and roller assembly (140, 150) is likewise secured to the wall of the window frame. In this embodiment, the roller bracket (140) may be secured directly to the fascia (120) by means of screws or other suitable fasteners.

FIG. 10 is a closer composite view of the floating fascia system (400) according to a further alternate embodiment of the present invention. FIG. 10 shows the fascia support (410) secured to the T-bracket (130) and provides further detail on the placement of the locking pin (180) and level screw (170) through the fascia support (410) and onto or into the T-bracket (130).

FIG. 11 is a composite exploded view of the floating fascia system (400) of FIGS. 9 and 10, ready for installation into a window frame or box according to a further alternate embodiment of the present invention. In the view provided by FIG. 11, the fascia (120) appears in the foreground ready to be mounted to the window frame (shown but not labeled) in the background of the figure. In this illustration, the roller shade (150) is already secured directly to the back, window-facing side of the fascia (120) by means of roller brackets (140) hidden from view by the fascia (120). Two fascia supports (410), one on each end of the fascia (120), are shown ready to be secured to the fascia (120) by means of screws (not shown) or other suitable fasteners. Two T-brackets (130), each corresponding to the two fascia supports (410), are shown between the fascia supports (410) and the window frame. The T-brackets may be secured to the window frame by two or more screws (shown but not labeled) and the T-brackets (130) further secured to the fascia supports (410) by the locking pins (180).

Figure 12A:
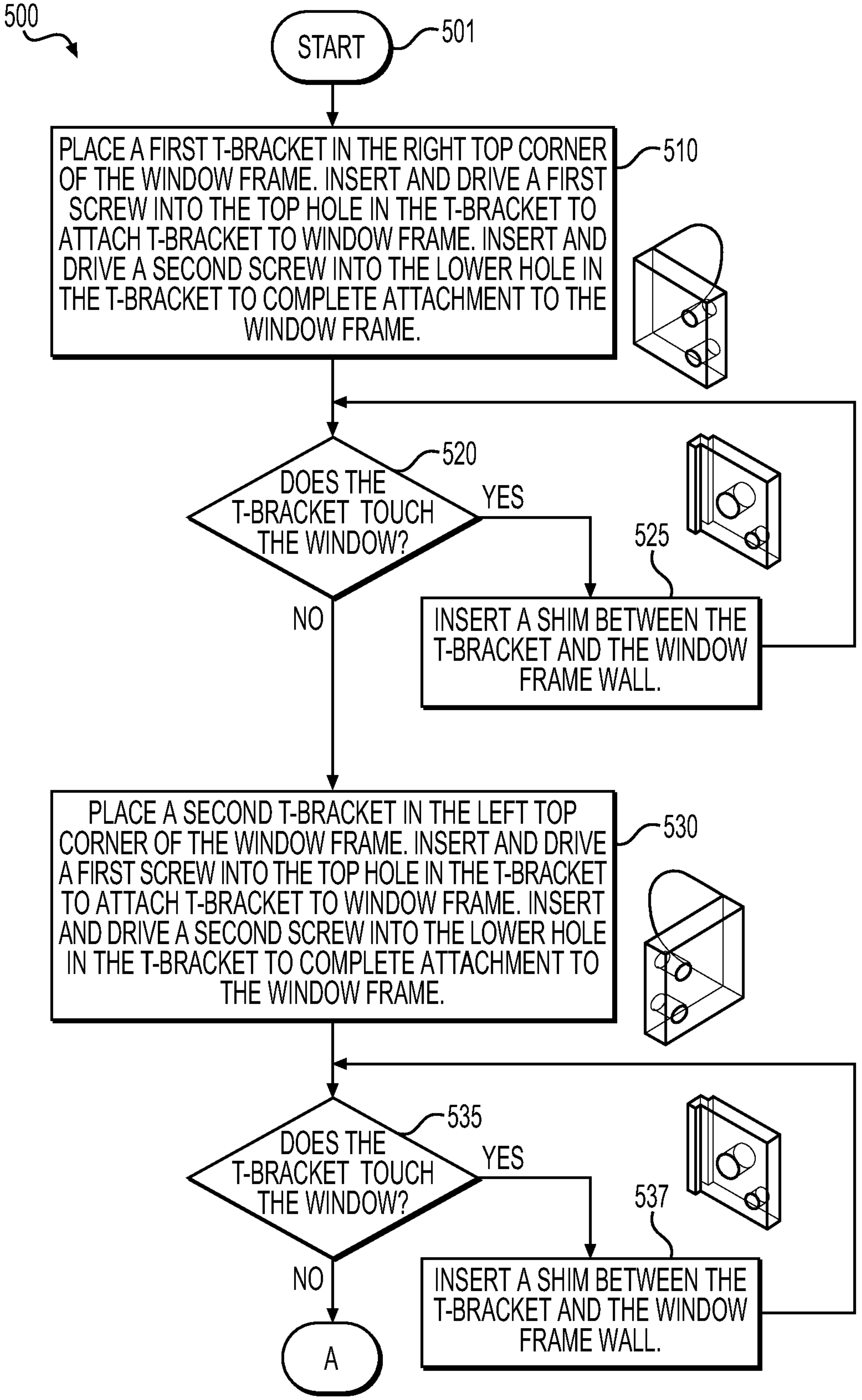
FIG. 12A illustrates the initial steps of a method 500 for installing the floating fascia system of the present invention.
Figure 12B:
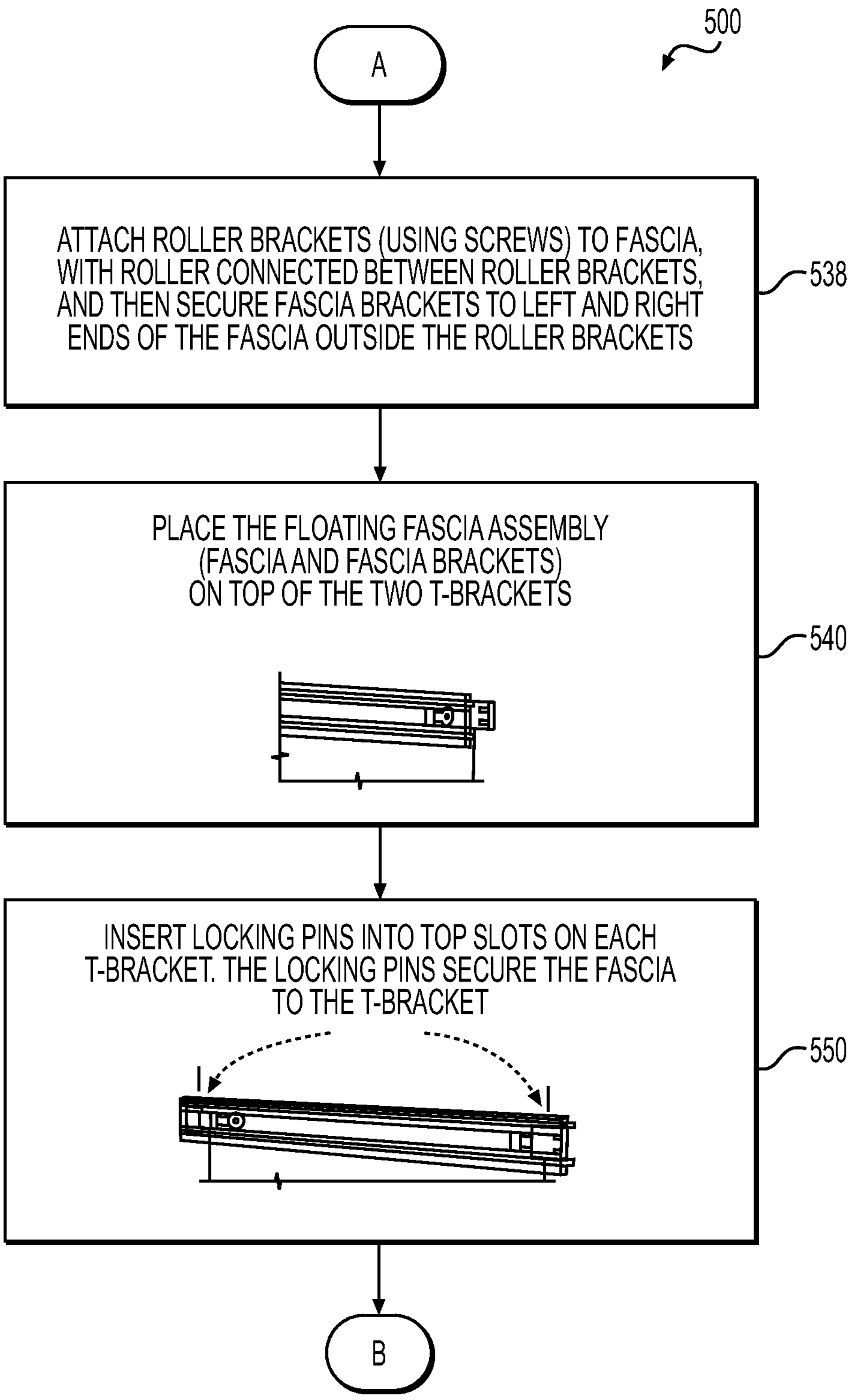
FIG. 12B illustrates further steps of a method 500 for installing the floating fascia system of the present invention.

FIGS. 12A, 12B, and 12C illustrate a series of steps for a method (500) for installing and adjusting the floating fascia system (100) of the first embodiment or the smart fascia system (200) of the further embodiment onto a window frame.

The method 500 begins (501) in FIG. 12A by first placing (510) and screwing in one T-bracket (130) into the top right corner of a window frame (not shown). A screw (not shown) is placed into oval-shaped hole (324) of the T-bracket (130) and the screw is screwed into the wall of the window frame. The elongated oval shape of hole (324) enables vertical adjustment of the T-bracket (130) on the window frame wall prior to final securing of the T-bracket (130) by means of a second screw. A second screw (not shown) is placed into circular hole (323) of the T-bracket and screwed into the wall, completing the attachment of the T-bracket to the window frame wall.

An optional step (520) is shown wherein if the ear (190) of the T-bracket (130) touches, contacts or abuts the window, additional space may be provided by adding (525) one or more shims (160) between the T-bracket (130) and the window frame wall.

Once the clearance between the wall and the T-bracket (130) is proper, the next step (530) comprises placing and screwing in a second T-bracket (130) in the top left corner of a window frame (not shown). A screw (not shown) is placed into oval-shaped hole (324) of the T-bracket (130) and the screw (not shown) is screwed into the wall of the window frame. In the preferred embodiment, oval-shaped hole (324) is above circular hole (323) on a flipped-over T-bracket for use in the top left corner of a window frame. In alternate embodiments, a separate left-handed T-bracket (130) having the oval-shaped screw hole (324) below the circular screw hole (323) may be used. As with placement in the top right corner, the elongated oval shape of hole (324)

enables vertical adjustment of the T-bracket (130) on the window frame wall prior to final securing of the left T-bracket (130) by means of a second screw. A second screw (not shown) is placed into hole (323) of the T-bracket (130) and screwed into the wall, completing the attachment of the T-bracket (130) to the window frame wall. As with steps 520 and 525 above, if (535) the ear (190) of the T-bracket (130) touches, contacts or abuts the window, additional space may be provided by adding (537) a shim (160) between the T-bracket (130) and the window frame wall.

If the ear (190) of the T-bracket (130) doesn't clear the window, then the roller shade may be positioned too close to the window. The placement of the ear (190) ensures clearance of the roller shade (150).

The method 500 proceeds in FIG. 12B with step 538 wherein two roller brackets (140) are secured to the left and right ends of the window-facing side of fascia (120) by means of appropriate screws and the roller shade (150) is attached between the two roller brackets (140). Two fascia brackets (110) are secured to the left and right ends of the fascia (120) by means of screws (not shown) through screw holes (311, 312, 313) in the fascia bracket (110). The assembly of the fascia (120), fascia brackets (110), roller brackets (140) and roller shade (150) is then secured (540) to the T-brackets (130) via connection of the fascia brackets (110) to the T-brackets (130). In alternate embodiments, the fascia brackets (110) may be secured to the T-brackets (130) prior to securing the fascia (120) (along with the attached roller brackets (140) and roller shade (150)) to the fascia brackets (110).

The installing (500) and adjusting of the floating fascia system (100) continues with step (540) wherein the floating fascia (120), with one fascia bracket (110) attached to each end and roller brackets (140) and roller shades (150) attached to the fascia (120), is placed onto the two T-brackets (130) now attached to the window frame wall. As noted above, in alternate embodiments, the fascia brackets (110) may be secured to the T-brackets (130) prior to securing the fascia (120) (along with the attached roller brackets (140) and roller shade (150)) to the fascia brackets (110). In step (550), a locking pin (180) is inserted into the top oval slot (318) of the fascia brackets (110) on each end, left and right, and down through the vertical hole (326) of the T-brackets (130) and out the bottom oval slot (319) of the fascia bracket (110). With one locking pin (180) inserted into each end of the fascia (120) through the two T-brackets (130), the fascia (120) is now fixed to the window frame wall through the T-brackets (130).

In FIG. 12C, the method (500) continues with a step (560) wherein the fascia (120) may then be leveled (560) by measuring the level of the fascia (120) and adjusting the level by tightening or loosening the level screws (170) in each of the right and left T-brackets (130).

Finally, the horizontal centering (570) of the fascia (120) may be achieved by sliding the fascia (120) left to right or right to left, enabled by the gap available between the locking pins (180) and the oval slots (318, 319) in the T-brackets (130). Upon completing the horizontal centering step (570), the floating fascia (120) is now properly installed on the window.

Since walls and window openings are rarely level, plumb, and even, if at any time during the process the installer wishes to position the fascia further away from the wall or wishes to position the roller further away from the glass, on one or both sides of the window, one or more shims (160) may be added to one or both T-brackets (130) on each side of the window.

A similar installation method may be achieved with the smart fascia (210), wherein the smart fascia (210) takes the place of the combined facia bracket (110) and fascia (120), with the roller brackets (140) and roller shade (150) attached to the smart fascia (210). In this alternate method, the smart fascia (210) includes the necessary holes and slots (347, 348, 349) that would be otherwise located on a fascia bracket (110). In addition, with the smart fascia (210), the roller brackets (140) may be attached to the smart fascia (210) by means of fitting securely into appropriate slots or channels, such as channels 341, 342, 343, the center channel (344), or similar channels, formed into the smart fascia (210). All steps of the method are otherwise the same.

FIGS. 13, 14, 15, and 16 provide alternate composite orthogonal views of an alternate embodiment of a smart fascia system (600) similar in form to the smart fascia system (200) of FIGS. 3, 4, and 8, but with an alternate fixing bracket configuration to enable a ceiling mount of the system (600). This ceiling mount configuration allows for installation of the roller shade and smart fascia system (600) to the inside top surface of a window's frame or on a ceiling above the window frame. FIGS. 13, 14, 15, and 16 show differing views of the smart fascia system (600) and each figure will be referenced as needed for selected aspects of the system (600) throughout the following description.

Figure 13:
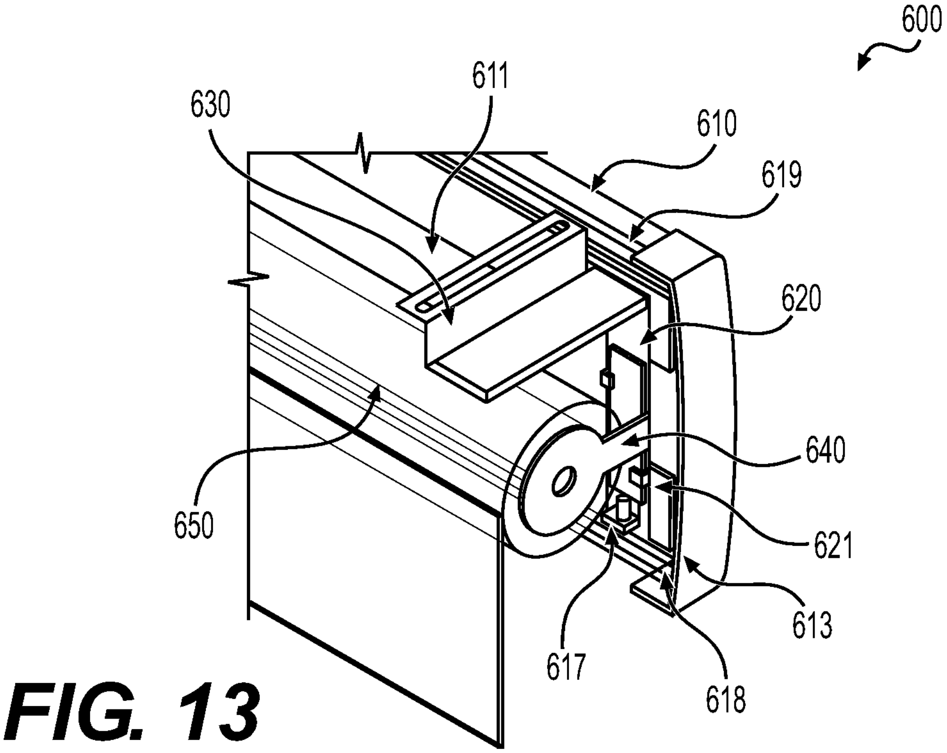
FIG. 13 is a composite view of a ceiling mount smart fascia system 600 according to an alternate embodiment of the present invention.
Figure 14:
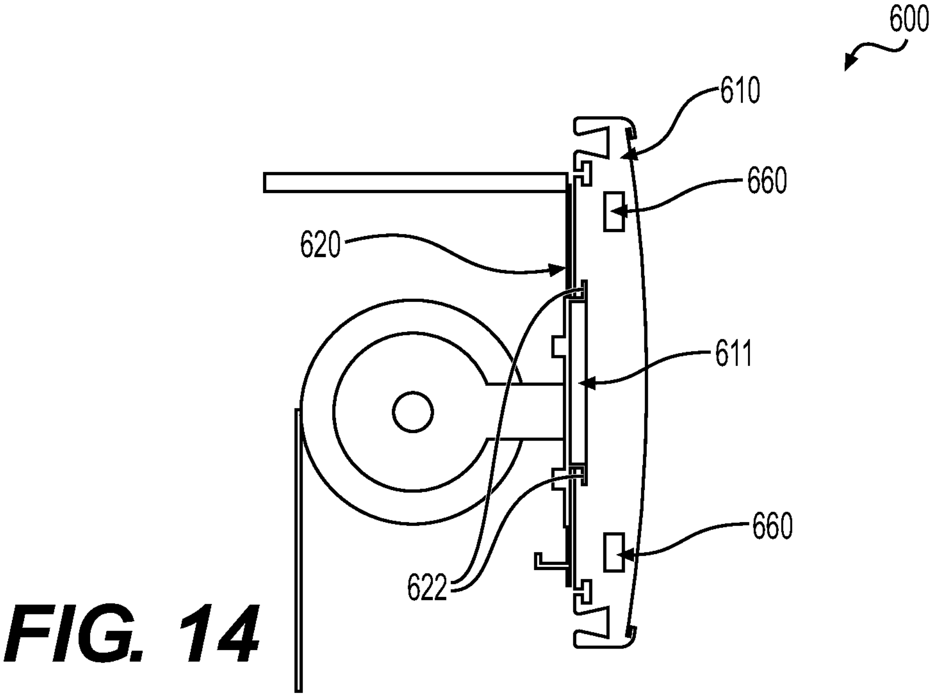
FIG. 14 is a side view of the ceiling mount smart fascia system 600 according to an alternate embodiment of the present invention.
Figure 15:
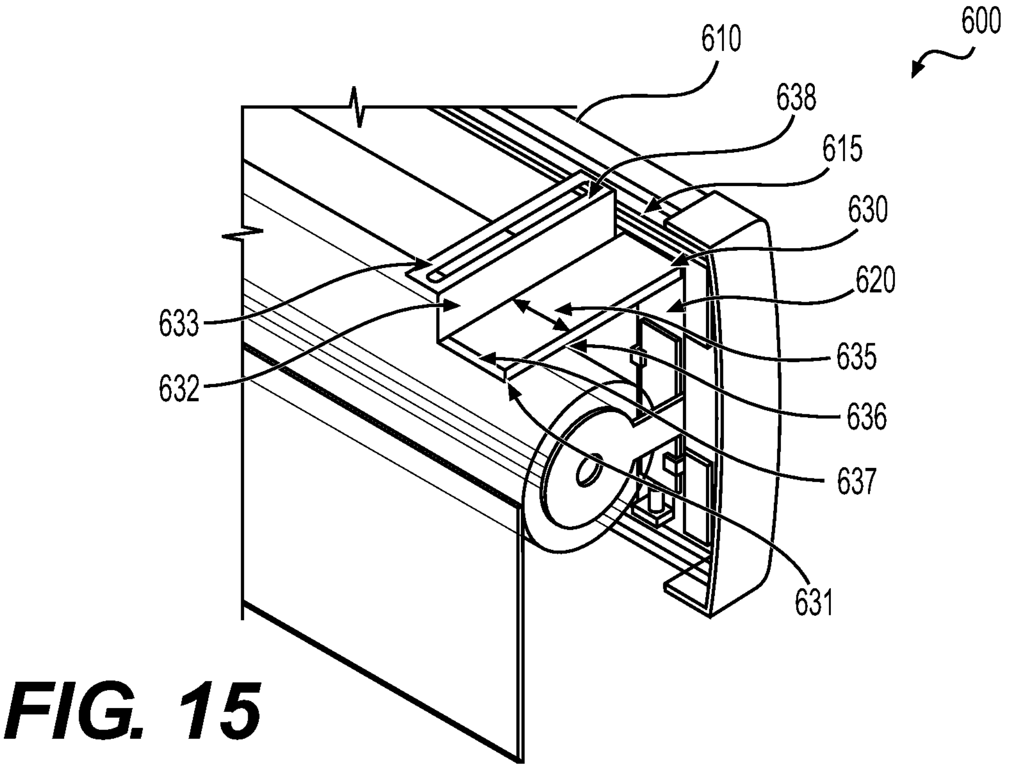
FIG. 15 is a further detailed view of a ceiling mount smart fascia system 600 according to an alternate embodiment of the present invention.

The smart fascia system (600) of FIG. 13 comprises at least two L-brackets (620). The smart fascia system (600) further comprises at least two unique ceiling brackets (630) that serve to secure the smart fascia system (600) to the top surface of a window frame, what is sometimes referred to in the art as an "inside the mount" (also called "inside mount" or "IB"), or to secure the smart fascia system (600) to a ceiling. A smart fascia (610), similar in form and function to the smart fascia (210) of FIGS. 3, 4, and 8, is mounted on two or more L-brackets (620). At least one L-bracket (620) is located near each of the two ends of the smart fascia (610). The smart fascia (610) is affixed to the L-bracket (620) through the center channel (611) formed in the smart fascia (610) by means of one or more center channel hooks (622) that protrude from the L-bracket (630) into the center channel (611), as shown in FIG. 14. The L-bracket (620) slides into the center channel (611) from the side. The L-bracket (620) may slide along the smart fascia (610) within the center channel (611) via the center channel hooks (622) allowing for adjustments (from left to write or in the x-axis) of the positioning of the L-Brackets (620) on the smart fascia (610) before, during and after the installation of the system (600). The center channel (611) may be formed in the shape of a rectangular, trapezoidal, or dovetailed notched shape running parallel to the center line of the smart fascia (610). The center channel (611) may be provided in order to enable placement or attachment of additional extensions to the smart fascia (610).

Each L-bracket (620) can be made of various materials which are sturdy enough to carry the weight of the smart fascia (610) including metals such as extruded aluminum or other suitable metals, plastics such as molded plastic or other suitable plastics, wood, or composite materials. The smart fascia (610) may be made of many different materials including various decorative materials. The smart fascia (610) is typically made of wood, plastics, aluminum or composites, and can be painted or dressed in fabric to match the décor of the room in which the window (not shown) is found. However, many other more exotic man-made or natural materials may be used such as plaster, porcelain, or PVC.

The L-bracket (620) forms an "L" shape, and one branch of the L extends in a direction perpendicular to and away from the smart fascia (610) and towards the window. There may be at least two bracket hooks (621) formed on the surface of the L-bracket (620) placed parallel and adjacent to the smart fascia (610), with the bracket hooks (621) facing away from the smart fascia (610) and towards the window. The bracket hooks (621) hold the roller bracket (640) in place on the smart fascia (610). The bracket hooks (621) may be arranged and placed in order to retain the roller bracket (640) and balance the weight of the roller shade (650) attached to the roller brackets (640) and to the L-brackets (620). A third bracket hook (621) at a higher location on the L-bracket (620) situated on the side of the L-bracket facing the smart fascia (610) may be placed to prevent the roller bracket (640) from bending, pivoting, or sliding off accidentally. The bottom of the L-bracket (620) further includes a lip (shown but not labeled) containing a circular screw hole through it. A level screw (617) may be inserted into the circular screw hole on the lower lip of the L-bracket (620).

The level screw (617) may be turned to clockwise to push up through the L-bracket (620) and onto the bottom surface of a roller bracket (640), thereby raising the roller bracket (640) in relation to the L-bracket (620). This arrangement of the level screw enables adjustments in the positioning of the roller bracket (640) and by extension adjustment of the window covering roller shade (650) in the up-and-down or y-direction. Such adjustment capacity allows for a leveled installation of the window covering roller shade (650).

In one embodiment of the present invention, the roller brackets (640), roller shade (650) and L-brackets (620) are secured to the smart fascia (610) by means of appropriate adjustments and insertion prior to mounting the assembly of the smart fascia (610), L-brackets (620), roller brackets (640) and roller shade (650) all to two or more ceiling brackets (630) via connection of the L-brackets (620) to the ceiling brackets (630). In alternate embodiments, the L-brackets (620) may be secured to the ceiling brackets (630) prior to securing the smart fascia (610) (along with the attached roller brackets (640) and roller shade (650)) to the L-brackets (620).

Figure 16:
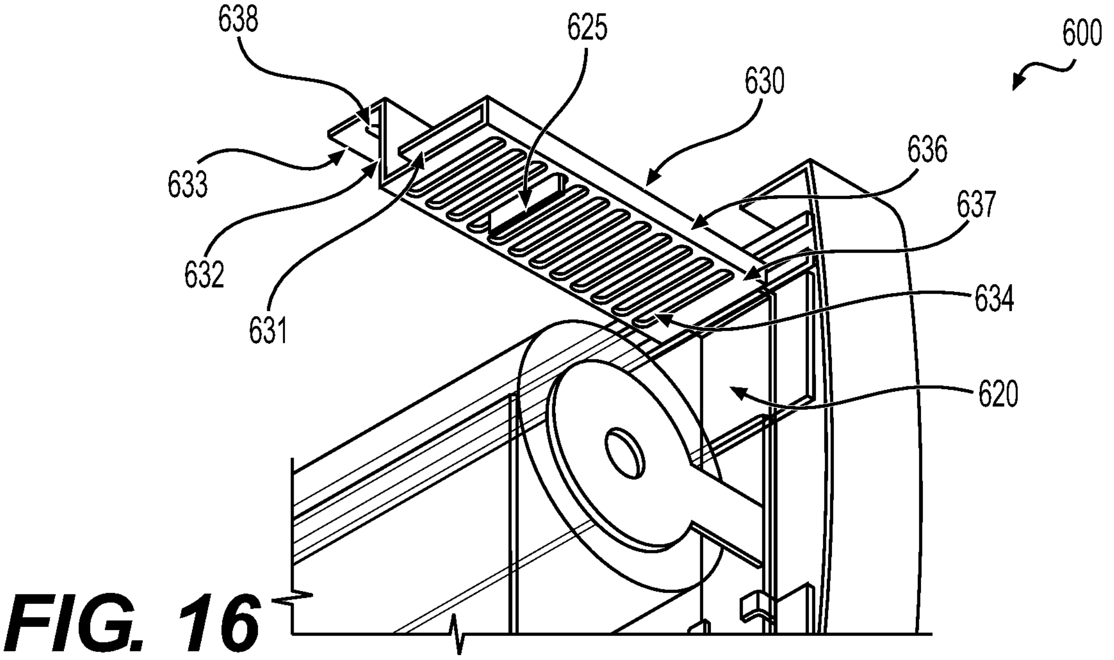
FIG. 16 is an alternate further detailed view of the ceiling mount smart fascia system 600 according to an alternate embodiment of the present invention.

Referring to FIG. 16, the smart fascia system (600) further comprises a unique ceiling bracket (630) that serves to secure the smart fascia system (600) to the top surface of a window frame, what is sometimes referred to in the art as an "inside the mount" (also called "inside mount" or "IB"), or to secure the smart fascia system (600) to a ceiling. Each of at least two ceiling brackets (630) includes a rectangular insertion box (631) illustrated in both FIGS. 15 and 16. The insertion box (631) of the ceiling bracket (630) is formed as a sideways "U" shape with each of lips (635, 636, 637) extending or curved to envelop one branch of the L-bracket (620) and to prevent the L-bracket (620) from sliding off the ceiling bracket (630). The insertion box (631) of the ceiling bracket (630) is composed of a top lip (635) which faces the ceiling or the top of the window frame (not shown), a bottom lip (637) which faces the opposite direction of the top lip (635) or toward the ground or the bottom of the window frame (not shown), and a side lip (636) which is on the opposite side of an extension (632) from the bottom lip (637) and links both the top lip (635) and the bottom lip (637). On one side of the insertion box (631) opposite the side lip (636), an extension (632) is linked to the bottom lip (637). The extension (632) is longer than the side lip (636) and extends upward to below the top rod cavity (619) of the smart fascia (610). The extension (632) forms a part of the ceiling bracket (630). The extension (632) extends in an upward direction towards the ceiling or window top (not shown) before bending at a 90° angle and extending further as a top extension (633). The top extension (633) is the surface that provided for connection of the smart fascia system (600) to the ceiling and/or window frame. The top extension (633) extends from the insertion box (631) of the ceiling bracket (630) towards the middle of the window frame (not shown). The top extension (633) further includes an oval opening (638). The oval opening (638) may take on a different shape than an oval if such a shape may be more convenient (i.e., round, rectangular, or any other shape). The oval opening (638) serves to provide a means to secure the ceiling bracket (630) to the window frame or ceiling using screws (not shown) passing through the oval opening (638). The oval opening (638) is formed so that one or more screws (not shown), preferably at least two, may be used for installation of the smart fascia system (600) to the ceiling and/or window frame.

Once the ceiling bracket (630) is securely attached to the ceiling or window frame, the smart fascia (610) can be installed to the ceiling bracket (630) using the L-bracket (620). The L-bracket (620) is inserted in the ceiling bracket (630) as seen best in FIG. 16. The bottom lip (637) of the insertion box (631) has safety slots (634) cut out in a succession of oval shapes. The safety slots (634) can be shaped differently if it's more convenient (e.g., round, rectangular, or any other shape). The L-bracket (620) has a safety extension (625) at the extremity of the surface that extends through the insertion box (631) of the ceiling bracket (630). The safety extension (625) extends downward from the L-bracket (620) towards the bottom or the ground. The safety extension (625) is long enough to slide into one of the safety slots (634) and prevent the L-bracket (620) from sliding out of the insertion box (631). The safety extension (625) cannot be longer than the full height of the insertion box (631) or the side lip (636) of the insertion box (631). The safety slots (634) may be slightly wider than the width of the L-bracket (620) itself, to allow an easy installation of the smart fascia system (600) and the L-bracket (620), and to enable adjustments to the smart fascia system (600) closer or further away from the window or on the z-axis following installation.

In the preferred embodiment of the smart fascia system (600), the arrangement described above enables a ceiling bracket (630) intended for attachment to an upper left inside corner of a window's frame. That same ceiling bracket (630) would be flipped around the center of its main body for attachment to an upper right corner of the window's frame, with the oval opening (638) now placed to the right of the insertion box (631) of the ceiling bracket (630). In alternate embodiments, the placement of the ceiling brackets (630) can be made on the ceiling in a similar way.

Optionally, the smart fascia (610) further includes at least two circular cross section channels (618, 619) for holding fabric rods (not shown) that enable easy attachment of fabric coverings to the outer face of the smart fascia (610). One or more further notched channel(s) (613) may be provided in the lower end of the smart fascia (610), below the L-bracket (620) and above the lower rod channel (618). In addition, one or more further notched channel(s) (615) may also be provided in the upper end of the smart fascia (610), above the L-bracket (620) and below the upper rod channel (619). The notched channel(s) (613, 615) may be rectangular, trapezoidal, or dovetailed in form and shape, and the notched channel(s) (613, 615) may enable the placement of various "smart" accessory devices such as sensors or LED light strips (not shown).

As seen in FIG. 14, each end of the smart fascia (610) may include holes (660), with at least one near the top and at least one near the bottom of each end of the smart fascia (610). The holes (660) enable the attachment of a cover to each end of the smart fascia (610) to conceal the various holes and channels of the smart fascia (610). Such a cover is not shown in FIG. 14, but can be seen in FIGS. 13, 15, and 16. Similar covers may also be provided for the smart fascias (210, 710) of the systems (200) of FIGS. 3 and 4 above and the system (700) of FIG. 17 below. Such covers may be formed of metal, plastic, wood or other materials that provide the best match to the décor of the fascia and of the window frame.

Figure 17:
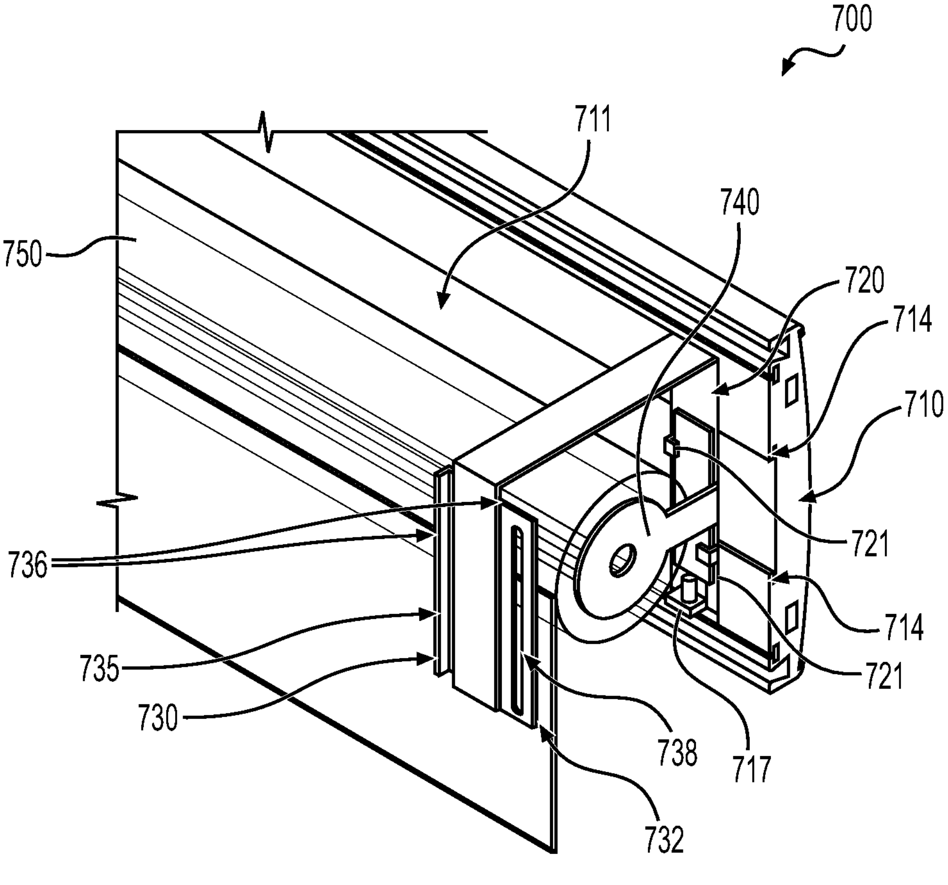
FIG. 17 is a composite view of a wall mount smart fascia system 700 according to a further alternate embodiment of the present invention.

The inside mount smart fascia system (600) of FIGS. 13-16 can be adapted to or used as an outside mount smart fascia system (700) shown in FIG. 17 by replacing the L-bracket (620) with a U-bracket (720) and replacing the ceiling bracket (630) with a wall bracket (730). Just like the L-bracket (620), the U-bracket (720) can slide on a smart fascia (710) that is substantially similar or identical to the smart fascia (610) through the center channel (711) and center channel hooks (714) protruding from the U-bracket (720), enabling adjustments before, during and after the installation of the system (700). The U-bracket (720), as its name indicates, comprises three major surfaces rather than the two major surfaces of the L-bracket (620). The third surface (not labeled) of the U-bracket (720) extends downward from the top surface (not labeled) of the U-bracket (720) and inserts into or behind a main body (735) of a wall bracket (730) to secure the U-bracket (720) to the wall bracket (730), and through the wall bracket (730), further secures the smart fascia system (700) to a wall or window frame vertical surface.

The U-bracket (720) allows for an installation on a wall where the use of the T-bracket (130) of the floating fascia system (100) and the smart fascia system (200) may be difficult or not desired by the end user. The outside mount smart fascia system (700) comprises at least two U-brackets (720). The fascia (710) is mounted on two or more U-brackets (720). At least one U-bracket (720) is located near each of the two ends of the smart fascia (710), and wherein each end of the smart fascia (710) is affixed to the U-bracket (720) by means of the center channel (711) and the center channel hooks (714) protruding from the U-bracket (720). The U-bracket (720) slides in the center channel (711) from the side of the fascia. The center channel (711) may be formed in the shape of a rectangular, trapezoidal, or dovetailed notched shape running parallel to the center line of the smart fascia (710). The center channel (711) may also be adapted to enable placement or attachment of additional extensions to the smart fascia (710). Roller brackets (740), again substantially similar or identical to the roller brackets (640) of the system (600), may be attached to the smart fascia (710) by fitting securely into the center channel (711), or into other similar channels, formed into the window-facing surface of the smart fascia (710).

The outside mount smart fascia (710), the roller bracket (740), top and bottom rod cavities (not labeled), a notched channel (not labeled), a level screw (717), bracket hooks (721), and the window covering roller shade (750) are identical to corresponding elements of the inside mount smart fascia system (600) and are installed and/or integrated with the smart fascia (710) and U-bracket (720) in the same manner.

The system (700) may be mounted to a wall or other surface using at least two wall brackets (730). The wall bracket (730) takes a form like that of the ceiling bracket (630) of the inside mount system (600) of FIGS. 14-16. Each of the at least two wall brackets (730) includes a rectangular main body (735).

The wall bracket (730) takes on a predominantly "U" shape, having three sides including the main body (735) and two additional lips (736) extending or curved away perpendicularly from each of two long sides of the main body (735) towards the wall or other mounting surface. The lips (736) are of the same length as the main body (735) and are part of the wall bracket (730). The main body (735) and the lips (736) together form an insertion box to enable the insertion of a branch of the U-bracket (720). Alternatively, a fourth surface or lip parallel to the main body (735), having the same length and width as the main body (735) and attached and perpendicular to the lips (736) could be included to complete four sides of an insertion box similar in form to the insertion box (631) of the system 600 above.

The lips (736) are wide enough to accommodate the width of the branches of the U-bracket (720) and the insertion of the downward-pointing branch of the U-bracket (720) closest to the window frame or wall into the wall bracket (730). On one side of the wall bracket (730), an extension (732) is linked to one lip (736). The extension (732) is part of the wall bracket (730) and is the same length as the main body (735) of the wall bracket (730). The extension (732) includes an oval opening (738). The oval opening (738) can be shaped in any manner that may be most functional and convenient (i.e., round, rectangular, or any other shape). The oval opening (738) serves to provide a means to secure the wall bracket (730) to the wall or surface using screw(s) (not shown) driven into the wall or surface. The oval opening (738) may be formed so that one or more screws (not shown), preferably at least two, can be used for the installation. The extension (732) is wide enough to accommodate the oval opening (738) and to be sturdy enough to be fixed to a surface with one or more screws (not shown) and support the smart fascia system (700) in its outside mount configuration as seen in FIG. 17.

The wall bracket (730), the U-bracket (720), the L-bracket (620), the roller bracket (640, 740), and the ceiling bracket (630) can each be made of various materials which are sturdy enough to carry the weight of the smart fascia and any and all of its components and attachments. They can be formed from, but not limited to, extruded aluminum or plastics, but also of wood, molded plastic, metals or composite materials.

In further alternate embodiments of the inside mount smart fascia system (600) and the outside mount smart fascia system (700) of the present invention, a third L-bracket (620) or U-bracket (720) may be attached at a middle or centered position along the length of the smart fascia (610, 710) and an additional center support bracket (not shown) attached to the L-bracket (620) or U-bracket (720) and further attached to the window frame in order to provide additional weight and center support for long or heavy smart fascias (610, 710) that may require added support. Alternatively, the additional center support bracket may be attached directly to the smart fascia (610, 710) and to the window frame without need of a L-bracket (620) or U-bracket (720).

FIGS. 18A and 18B describe a method (800) for installing the ceiling mount smart fascia system (600) of the present invention. The installation method (800) begins (801) in FIG. 18A by first placing (810) and screwing in one ceiling bracket (630) into the top right corner of a window frame.

A screw (not shown) is placed into oval opening (638) of the ceiling bracket (630) and the screw is screwed into the ceiling or inside top surface of the window frame. A second screw (not shown) is placed into oval opening (638) of the ceiling bracket (630) and screwed into the ceiling or inside top surface, completing the attachment of the ceiling bracket (630) to the ceiling or inside top surface of the window frame.

The next step (820) comprises placing and screwing in a second ceiling bracket (630) in the top left corner of a window frame. A screw (not shown) is placed into oval opening (638) of the ceiling bracket (630) and the screw (not shown) is screwed into the ceiling or inside top surface of the window frame. A second screw (not shown) is placed into oval opening (638) of the ceiling bracket (630) and screwed into the ceiling or inside top surface, completing the attachment of the ceiling bracket (630) to the ceiling or inside top surface of the window frame.

Once the ceiling brackets (630) are secured, roller brackets (640) are inserted (830) into the L-brackets (620) and held to the L-brackets (620) by the bracket hooks (621) formed in the L-brackets (620). The L-brackets (620) are then slid (840) into the center channel (611) of the smart fascia (610), with one L-bracket (620) slid into place on each end of the smart fascia (610). The roller shade (650) may be attached to the roller brackets (640) either before or after the L-brackets (620) are slid into the center channel (611).

The method (800) continues in FIG. 18B with step 850. The smart fascia (610), along with the attached L-brackets (620) and roller brackets (640), are attached (850) to the ceiling brackets (630) by inserting the L-brackets (620) into the insertion box (631) of the ceiling brackets (630). The safety extensions (625) of the L-brackets (620) are then inserted (860) through one of the safety slots (634) of the ceiling brackets (630) in order to ensure that the L-brackets (620) are securely attached to the ceiling brackets (630) and do not slide out of the ceiling brackets (630).

The roller shade (650) and smart fascia (610) may then be leveled (870) by measuring the level of the roller shade (650) and smart fascia (610) and adjusting the level by tightening or loosening the level screws (617) in each of the right and left L-brackets (630) to move the roller brackets (640) up or down as needed.

Finally, the horizontal centering (880) of the smart fascia (610), and the balancing of the gaps with the window frame on either side of the roller shade (650), may be achieved by sliding the smart fascia (610) left to right or right to left between the ceiling brackets (630), enabled by the sliding connection of the L-brackets (620) in the center channel (611) of the smart fascia (610). Upon completing the horizontal centering step (880), the smart fascia (610) is now properly installed on the window.

Figure 19A:
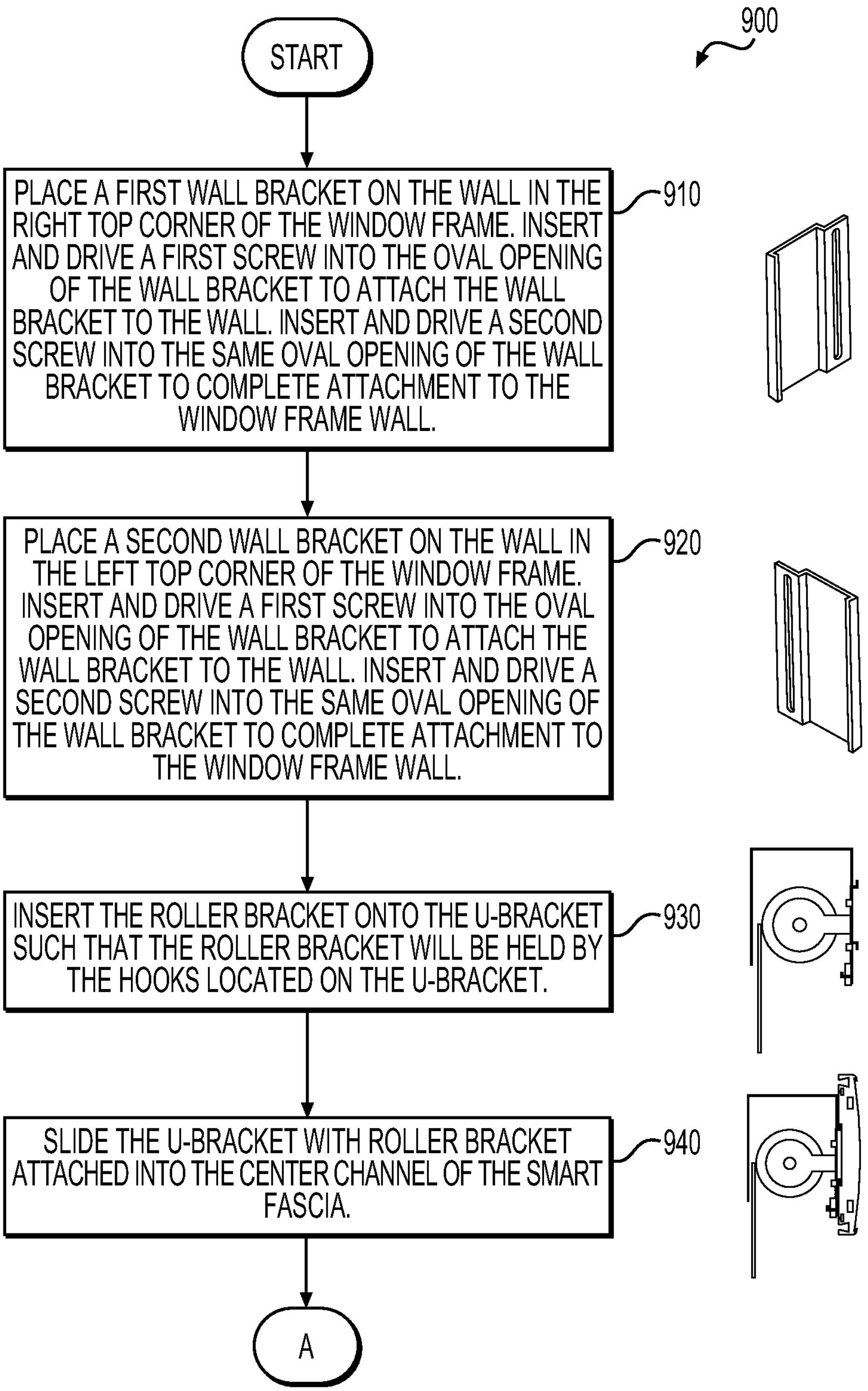
FIG. 19A illustrates the initial steps of a method 900 for installing the wall mount smart fascia system 700 of the present invention.
Figure 19B:
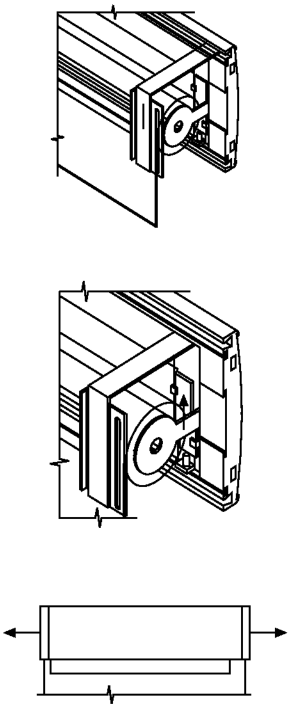
FIG. 19B illustrates the concluding steps of a method 900 for installing the wall mount smart fascia system 700 of the present invention.

A similar installation method (900) may be achieved with the smart fascia (710) of FIG. 17. The method (900) is shown in FIGS. 19A and 19B, and begins in FIG. 19A by first placing (910) and screwing in one wall bracket (730) into the top right corner of a window frame. A screw (not shown) is placed into oval opening (738) of the wall bracket (730) and the screw is screwed into the wall of the window frame. A second screw (not shown) is placed into oval opening (738) of the wall bracket (730) and screwed into the wall, completing the attachment of the wall bracket (730) to the wall of the window frame.

The next step (920) comprises placing and screwing in a second wall bracket (730) in the top left corner of the window frame. A screw (not shown) is placed into oval opening (738) of the wall bracket (730) and the screw (not shown) is screwed into the wall of the window frame. A second screw (not shown) is placed into oval opening (738) of the wall bracket (730) and screwed into the wall, completing the attachment of the wall bracket (730) to the wall of the window frame.

Once the wall brackets (730) are secured, roller brackets (740) are inserted (930) into the U-brackets (720) and held to the U-brackets (720) by bracket hooks (721) formed in the U-brackets (720). The U-brackets (720) are then slid (940) into the center channel (711) of the smart fascia (710), with one U-bracket (720) slid into place on each end of the smart fascia (710). The roller shade (750) may be attached to the roller brackets (740) either before or after the U-brackets (720) are slid into the center channel (711).

The method (900) continues in FIG. 19B with step 950. The smart fascia (710), along with the attached U-brackets (720) and roller brackets (740), are attached (950) to the wall brackets (730) by inserting the branch of the U-brackets (720) that is farthest from the smart fascia (710) into the gap between the wall and the main body (735) of the wall brackets (730). Alternatively, the wall brackets (730) may be made to include a complete four-sided insertion box formed by the main body (735), two lips (736) and a fourth side (not shown) that mirrors the main body in shape and size and attaches to the two lips (736) and abuts the wall. The branch of the U-brackets (720) that is farthest from the smart fascia (710) may then be inserted into this complete insertion box of the wall brackets (730).

The roller shade (750) and smart fascia (710) may then be leveled (970) by measuring the level of the roller shade (750) and smart fascia (710) and adjusting the level by tightening or loosening the level screws (717) in each of the right and left U-brackets (730) to move the roller brackets (740) up or down as needed.

Finally, the horizontal centering (980) of the smart fascia (710), and the balancing of the gaps with the window frame on either side of the roller shade (750), may be achieved by sliding the smart fascia (710) left to right or right to left between the wall brackets (730), enabled by the sliding connection of the U-brackets (720) in the center channel (711) of the smart fascia (710) via the channel hooks (714) of the U-brackets (720). Upon completing the horizontal centering step (980), the smart fascia (710) is now properly installed on the window.

With respect to the above description, it is to be realized that the optimum relationships for the components of the invention, to include variations in proportions and manner of use are deemed readily apparent and obvious to one skilled in the art.

Therefore, the foregoing is considered as illustrative only of the principles of the invention. Further, since numerous modifications and changes will readily occur to those skilled in the art, it is not desired to limit the invention to the exact composition and use shown and described, and accordingly, all suitable modifications and equivalents may be resorted to, falling within the scope of the invention.

We claim:

1. A system to indirectly mount a roller shade window covering, comprising:

a roller shade assembly having two roller brackets and a window shade roller;

two T-brackets to indirectly secure the roller shade assembly to a window frame of a window and to provide spacing of the roller shade assembly from a window;

a fascia extending at least as wide as a width of the window;

two fascia brackets to enable attachment of the fascia to each of the two T-brackets, wherein the fascia brackets are placed toward ends of the fascia;

two locking pins, wherein the pins operate to attach the fascia brackets to the T-brackets; and two level screws for adjusting spacing between each of the fascia brackets and each of the T-brackets in a vertical direction;

wherein the fascia brackets and roller brackets are attached to the fascia and the fascia brackets are attached to the T-brackets which are affixable to the window frame; and wherein the fascia is adjustable relative to the T-brackets in a first horizontal direction.

2. The system of claim 1 wherein each of the T-brackets includes an integrated shim and wherein the shim provides adjustment of a position of the T-bracket in a second horizontal direction transverse to the first horizontal direction relative to the window.

3. The system of claim 1 wherein each of the T-brackets has an ear and wherein the ear guides a location to mount the T-brackets relative to the window.

4. The system of claim 1 further comprising a center bracket support for the fascia.

5. The system of claim 1 further comprising a fabric fascia cover.

6. The system claim 1 further comprising LED lights mounted on the fascia.

7. The system of claim 1 wherein the fascia bracket and the fascia are one piece.

8. The system of claim 1 wherein the roller shade assembly is a smart roller shade assembly.

9. A method for mounting a floating window roller shade comprising:

mounting a first wall bracket on a right side of a window frame opening;

mounting a second wall bracket on a left side of the window frame opening;

wherein each of the wall brackets has a main body and an ear which is approximately perpendicular to the main body and wherein when mounted each of the wall bracket ears is closer to the window than the main body;

adjusting the mounting of at least one of the wall brackets in a first horizontal direction using an integrated shim, wherein the adjusting moves the ear away from the window;

attaching a roller shade assembly to a fascia, wherein the roller shade assembly includes a rolled-up window shade which is movable from a lowered down position to a rolled-up position;

coupling the fascia to fascia brackets;

fastening the fascia brackets to the first and second wall brackets using a locking pin;

adjusting a height of the fascia relative to one of the mounted wall brackets using a leveling screw; and adjusting a position of the fascia left or right to make a gap between the roller shade assembly and the window frame similar on right and left of the roller shade assembly.

10. The method of claim 9 further comprising the step of attaching a fabric cover to the fascia.

11. The method of claim 9 further comprising the step of painting the fascia.

12. The method of claim 9 further comprising the step of attaching LED lights to the fascia.

13. The method of claim 9 further comprising the step of attaching one or more sensors to the fascia.

14. The method of claim 9 further comprising the step of mounting a center bracket support for the fascia.

15. The method of claim 9 further comprising the step of mounting an electric motor to lower and raise the rolled-up window shade.

16. The method of claim 9 further comprising the step of attaching two or more accessories to the fascia.

17. A mountable window covering with roller shade and fascia comprising:

a ceiling bracket having an opening and an insertion box with multiple slots, wherein the ceiling bracket is adjustably mountable to a ceiling using the opening, wherein the mounting is adjustable in a first horizontal axis;

an L-bracket with a safety extension, channel hooks, hooks, and a level screw, wherein the L-bracket connects to the ceiling bracket through the insertion box and wherein the safety extension fits within one of the multiple slots, and wherein the L-bracket is adjustable in the first horizontal axis with reference to the ceiling bracket;

a roller with a window covering;

a roller bracket attached to the roller and connected to the L-bracket, wherein the roller bracket is held by the L-bracket with the hooks and rests on the level screw;

a fascia mounted on the L-bracket, wherein the fascia includes a horizontal channel;

wherein the channel hooks fit in the horizontal channel, wherein the channel hooks are slidable in the horizontal channel, and wherein the fascia can be moved with reference to the L-bracket in a second horizontal axis transverse to the first horizontal axis; and wherein the level screw adjusts the location of the roller with reference to the L-bracket in a vertical axis.

18. The mountable window covering of claim 17 wherein the roller with the window covering is a smart roller shade assembly.

19. The mountable window covering of claim 17 further comprising an electric motor operably connected to lower and raise and the window covering.

20. The mountable window covering of claim 17 further comprising LED lights attached to the fascia.

21. The mountable window covering of claim 17 further comprising a sensor attached to the fascia.

22. The mountable window covering of claim 17 further comprising an accessory attached to the fascia.

* * * * *